United States Patent [19]

Lee

[11] Patent Number: 5,542,310
[45] Date of Patent: Aug. 6, 1996

[54] CONTINUOUS-TORQUE VARIABLE-SPEED MECHANICAL GEAR TRANSMISSION

[75] Inventor: Gary D. Lee, Woodland Hills, Utah

[73] Assignee: The Anchored Corporation, Woodland Hills, Utah

[21] Appl. No.: 220,501

[22] Filed: Mar. 31, 1994

Related U.S. Application Data

[63] Continuation-in-part of Ser. No. 66,663, May 25, 1993.

[51] Int. Cl.$^6$ .............................................. F16H 3/083
[52] U.S. Cl. .................................................... 74/372
[58] Field of Search .............................. 74/370, 371, 372

[56] References Cited

U.S. PATENT DOCUMENTS

| | | | |
|---|---|---|---|
| 501,381 | 7/1893 | Taylor | 74/371 |
| 683,003 | 9/1901 | Schellenbach . | |
| 735,068 | 8/1903 | Curtis | 74/371 |
| 921,522 | 5/1909 | Dunkel . | |
| 965,461 | 7/1910 | Holland . | |
| 1,015,254 | 1/1912 | Whisler | 74/372 |
| 1,099,587 | 6/1914 | Bugatti | 74/372 |
| 1,102,427 | 7/1914 | Morgan | 74/372 |
| 1,189,136 | 6/1916 | Kirchhoff . | |
| 1,597,944 | 8/1926 | Wilson | 74/372 |
| 1,661,892 | 3/1928 | Girones . | |
| 1,740,725 | 12/1929 | Brown . | |
| 2,045,835 | 6/1936 | Coen . | |
| 2,103,959 | 12/1937 | Spinner | 74/372 |
| 2,168,322 | 8/1939 | Butler | 74/371 |
| 2,320,960 | 6/1943 | Wheaton . | |
| 2,426,154 | 2/1947 | Chilton . | |
| 2,505,464 | 4/1950 | Debuit . | |
| 2,590,232 | 3/1952 | Chilton . | |
| 2,592,982 | 4/1952 | Violet | 74/372 |
| 2,807,965 | 10/1957 | Frank . | |
| 2,861,461 | 11/1958 | Kreidler | 74/371 |
| 3,028,763 | 4/1962 | Vetsch . | |
| 3,067,626 | 12/1962 | Doerries et al. | 74/372 |
| 3,154,962 | 11/1964 | Mukherjee . | |
| 3,463,028 | 8/1969 | Polidor . | |
| 3,662,613 | 5/1972 | Ingalls | 74/371 |
| 3,686,957 | 8/1972 | Kirn et al. | 74/371 |
| 3,691,861 | 9/1972 | Stürmer | 74/330 |
| 3,707,884 | 1/1973 | Go | 74/372 |
| 3,812,735 | 5/1974 | Von Kaler et al. | 74/371 |
| 4,088,037 | 5/1978 | Carr | 74/371 |
| 4,141,424 | 2/1979 | Murayama et al. | 74/372 |
| 4,292,855 | 10/1981 | Murayama | 74/372 |
| 4,343,612 | 8/1982 | Blanchard | 74/372 |
| 4,505,164 | 3/1985 | Yoshida | 74/371 |

(List continued on next page.)

FOREIGN PATENT DOCUMENTS

| | | | |
|---|---|---|---|
| 0079176 | 10/1982 | European Pat. Off. . | |
| 1037278 | 8/1958 | Germany | 74/372 |
| 1919008 | 10/1970 | Germany . | |
| 3037990 | 5/1982 | Germany . | |
| 439345 | 9/1948 | Italy | 74/372 |
| 20127 | 12/1906 | United Kingdom | 74/372 |
| 566411 | 12/1944 | United Kingdom . | |

*Primary Examiner*—John J. Vrablik
*Attorney, Agent, or Firm*—Snow, Christensen & Martineau

[57] ABSTRACT

A transmission apparatus for changing the speed of a driven member relative to the speed of a driving member while providing continuous torque to the driven member. The apparatus includes reducing gears driven by a driving member, annular cam gears in continuous engagement with the reducing gears, and a rotatably mounted hollow drum having a plurality of radially extending apertures each containing a detent arranged for reciprocating movement for engaging an inner cam surface of a corresponding cam gear mounted for rotation about an outer drum surface. A cam member mounted within the drum for reciprocal movement along the drum axis has an outer cam surface for respectively reciprocating the detents between a cam gear engaging position and a disengaged position. The inner cam surface of the cam gears have peak sections and valley sections, and axial movement of the cam member to initiate a gear shift is timed relative to the positions of the peak sections and valley sections on adjacent cam gears.

20 Claims, 9 Drawing Sheets

U.S. PATENT DOCUMENTS

| | | | |
|---|---|---|---|
| 4,662,241 | 5/1987 | Edwards | 74/371 |
| 4,702,121 | 10/1987 | Hartmann | 74/371 |
| 4,716,777 | 1/1988 | Hartmann | 74/372 |
| 4,779,475 | 10/1988 | Irikura et al. | 74/371 |
| 4,858,739 | 8/1989 | Nemoto | 74/371 |
| 4,966,574 | 10/1990 | von Kaler et al. | 74/371 |
| 5,030,179 | 7/1991 | Ganoung | 74/333 |
| 5,063,794 | 11/1991 | von Kaler | 74/371 |
| 5,094,121 | 3/1992 | von Kaler | 74/371 |

UPSHIFT CYCLE

5,542,310

CONTINUOUS-TORQUE VARIABLE-SPEED MECHANICAL GEAR TRANSMISSION

CROSS-REFERENCE TO RELATED APPLICATIONS

This application is a Continuation-In-Part of application Ser. No. 08/066,663 filed May 25, 1993, in the name of Gary D. Lee, the entire contents of said prior application being expressly incorporated herein by reference.

TECHNICAL FIELD OF THE INVENTION

The present invention is directed to a new and improved method and apparatus for changing gear ratios without the necessity of disengaging a torque from the transmission system.

BACKGROUND OF THE INVENTION

For many years the changing of gear ratios in a mechanical device has been accomplished by disengaging the torque from the transmission system, usually with a clutch.

Attempts also have been made to change gear ratios by randomly forcing a plurality of "keys" between closely spaced teeth of internally-toothed gears. This brute force approach also involves a momentary disengagement of torque from the transmission and some slippage may occur when power is being transferred from one set of keys to another set of keys, i.e., before the other set is randomly engaged. This approach also may cause rapid wearing and/or breakage of both the keys and the internal teeth, as well as binding and/or lockup of gears.

Different non-gear designs have been used for the purpose of changing the ratio while providing continuous torque. One such design is a double pulley arrangement constructed of metal elements that drive a V-belt. This design is presently used in snowmobiles, but belt wear resulting in slippage and/or belt breakage has been a problem.

Another design uses rolling elements between an inner input gear and an outer output gear arranged much like an epicyclic gear train. Although the rolling elements can continuously change the gear ratio, they are torque-limited because they rely on the coefficient of static friction to transmit forces between the rolling elements.

DISCLOSURE OF THE INVENTION

The foregoing and other problems of the prior art are overcome by the present invention. The present invention also provides a number of advantages. For example, power can be applied to either end of the transmission, depending upon the application. The transmission includes a gear shifting assembly which lends itself to many applications and has several variables. For example, the number of peaks and valleys in the cam gears, as well as the gear ratios, may all be manipulated to accomplish the task for which the particular application of the invention is intended. Although the power transmitting components of the transmission are preferably made of metal, these components also may be made of modern plastics for some applications.

THE GEAR SHIFTING ASSEMBLY

The Cam Gears

The gear shifting assembly comprises a plurality of annular cam gears, each of which is shaped like a flat donut and has an outer periphery with gear teeth in profile. A central aperture through each cam gear provides a continuous inner cam surface having at least one segment, preferably repeating segments, defining an inner periphery of the gear. Each segment of the cam surface is composed of three sections which together form a recess providing a V or U shaped valley section into which a correspondingly shaped detent can be inserted. The valley section includes the bottom of the V or U shape, which is that part of the cam surface farthest from the rotational axis of the cam gear. A peak section includes a top or crest, which is that part of the cam surface closest to the cam gear axis.

Opposing side or incline sections connect the peak section and the valley section where the cam gear has only one segment. Where the cam gear has two or more segments, one incline section connects the peak and valley sections of one segment and the opposing incline section connects this valley section to the peak section of an adjacent segment. The opposing incline sections are each steep enough so that when the detent is inserted into the valley bottom and held there by an underlying bullet member, the cam gear and the output shaft are locked together for rotation.

Thus, at least one cam segment is cut into each cam gear, preferably at least two segments, and more preferably three to six segments depending upon the application. The cam surface profile of each section of each cam segment can be shaped to influence the characteristics of a shifting sequence, also depending upon the application.

For example, in a six cam segment design, where the rotations of adjacent cam gears differ by one third for every rotation of the input shaft, the cam segments can be divided into two sets, one set which lines up for a shift at a zero degree (0) mark of the input shaft and the other set which lines up for a shift at a 180 degree mark. One set can have sections with cam surface profiles to perform specific functions for upshifting uphill and downhill, and another set can have sections with cam surface profiles to perform specific functions for downshifting uphill and downhill.

The Drum

The output shaft includes a hollow cylinder portion (referred to herein as the drum) whose outer diameter is sized to fit inside the inner diameter of the cam gears with a sliding oil tolerance fit as defined by the tops of the peak sections that rest on the drum surface. Guide apertures (generally two or more to correspond with the number of valleys in the cam surface) in the drum wall contain and guide the detents which are shaped to engage the valley sections of the cam surface. If desired, the drum can be designed as the input shaft instead of the output shaft. Although this design may provide different input and output ratios, the rules of interaction between the components of the shifting assembly are the same in both designs.

The Detents

The detents may have a variety of shapes, such as spherical, oblong or rectangular, and preferably the shape of the engaging portion of the detents conforms to the shape of the cam gear valleys so as to maximize the surface to surface contact area for locking the cam gear to the drum during full engagement of that cam gear. The detents are also designed in such a way as to direct, as much as possible, a driving force vector in the direction of the drum's rotation, and not radially along the aperture wall of the output drum. Each set of the guide apertures (preferably two or more per set) is positioned such that its guide apertures are spaced uniformly around the drum circumference directly underneath a corresponding cam gear that is fitted over the drum portion of the output shaft. This places each set of the detents in the radial plane of its corresponding cam gear. The respective sets of guide apertures may be located in-line or offset with respect to each other in the drum wall.

The detents, each of which may be a ball, a cylindrical pin, an oblong bolt, a rectangular shaft, or the like, have a top end shaped to slide along the inner cam surface and engage the valleys of the cam gears, sides shaped to slide in and out of the guide apertures in the drum wall, and a bottom end shaped to follow the contoured cam grooves in the body of the bullet. In some applications, the inner cam surface of the cam gears and the detent arrangement are so configured as to minimize the forces acting upon the bullet and to maximize the forces acting upon the wall of the guide apertures of the drum. Generally, the steeper the angle or curve of the detent top and of the corresponding incline sections of each cam surface segment, the more force is directed into the drum rotation. The detent and cam surface tolerances, along with an optional oil orifice in the detent, control the movement of oil for the purpose of lubricating and dampening the shift.

The Bullet

The bullet is preferably a cylindrical piece that fits with close tolerances inside the inner diameter of the drum section of the output shaft and has contoured grooves cut into its outer cylindrical surface to receive the bottoms of the detents. The bottom of each groove in the bullet provides a cam surface which is designed (along with the shape of the cam surface on the inner periphery of the cam gear) to move the detents between desired radial positions and to control the characteristics of the shifting sequence. Generally, the bullet moves axially in synchronization with rotation of the cam gears to control movement of the respective sets of detents along the cam surfaces in the active cam gear and the to-be-engaged cam gear.

The bullet member is not limited to having a number of cam grooves equal to the number of detents. For example, the bullet can be rotated in the drum to change its angular orientation with respect to the drum in order to utilize one set of cam grooves for an upshift cycle and then rotated back to utilize another set of cam grooves for a downshift cycle. The bullet cam grooves may also have other configurations as further described below.

The Bullet Positioning Mechanism

The bullet is connected to and maneuvered by a bullet positioning mechanism. The bullet positioning mechanism is used to control and change the position of the bullet so as to cause a gear shift. This can be accomplished in a variety of ways, such as by a screw shaft, a mechanical lever, a set of gears, an electrical motor, an electrical solenoid, a pneumatic mechanism, or any other device for causing translational and/or rotational bullet movement. The bullet member preferably is connected to and moved by an axially movable shift shaft.

The bullet positioning mechanism must be responsive to timing and capable of synchronizing radial movement of the detents with the rates of bullet movement and cam gear rotation. The bullet positioning mechanism also may be responsive to a torque-sensing device in order to initiate a shift in automatic response to the load on the output shaft. The positioning mechanism preferably comprises a shifting cam element that is rotated in timed (synchronized) relation to the cam gear rotations by being driven by the input or output shaft.

Shifting

A gear shift occurs when the center of the bullet is moved along the axis of the drum from the center of the active (engaged) cam gear to the center of an adjacent cam gear to be engaged. By means of radially tapered grooves on the trailing and leading end portions of the bullet, the detents of the active set are allowed to retract from their corresponding cam valleys and thereby release the previously active cam gear, while simultaneously the detents of an adjacent set are wedged and thereby pushed radially outward from their released positions into inserted positions in their corresponding cam valleys.

The shift is initiated when the bottom of the valley section of the active cam gear is in a predetermined position of rotation about the axis of the drum relative to the position of the top of the peak section of the to-be-engaged cam gear being shifted into. Therefore, the positions of the cam gears must be consistently timed (synchronized) relative to each other and to the position of the bullet in order to initiate and maintain uninterrupted shifting without binding.

If movement of the bullet were to be divided along its axis of movement into 10 equal positions which represent different stages of a shift from one cam gear to an adjacent cam gear, then in the 0 and 10 positions, a different active cam gear is locked by its detents into engagement with the drum and the adjacent higher and lower cam gear detents are free of engagement. For example, the initially active cam gear in position 1 may be 10% of the way to being disengaged while the cam gear being shifted into may be 10% of the way to being engaged. In position 2, the active cam gear may be 20% of the way to being disengaged while the cam gear being shifted into may be 20% of the way to being engaged, and so forth until position 10 is reached where the initially active cam gear becomes inactive and the cam gear being shifted into becomes the new active cam gear.

In positions 1 through 9, there are two cam gears operating at different gear ratios and in different stages of engagement at the same time. No matter how fast these two gears are rotating, the shift is accomplished by their fixed and predetermined relationship to each other, and this depends on the difference in their gear ratios. Close ratios will allow relatively longer periods of time to complete a shift. In some circumstances, the shift may take several revolutions of the drum to complete. The drum rotation is determined by the engaged or partially engaged detents, and during shifting, represents a continuously changing compromise between the rotation rate of the active cam gear and the rotation rate of the cam gear being shifted into.

A CYCLE EMBODIMENT OF THE INVENTION

Power Flow

In a ring gear arrangement for a cycle application, the application of power begins at a cycle peddle and travels down a crank arm to a crank shaft. The crank shaft is affixed to a drive plate having two or more ring gears of differing diameters. Preferably, three or more ring gears on the drive plate are associated with and engaged by a corresponding number of cam gears. The drive plate, by means of the ring gears, transfers power to the cam gears such that the ring gears serve as reducing gears.

Three detents, such as steel ball bearings, are locked into their driving position in corresponding cam valleys of the engaged cam gear by means of a shifting cam member referred to as the "bullet." This allows power to be transferred from the engaged cam gear through the detents to a drum concentrically arranged within the cam gears. Power is then transferred from the drum through a drive gear to an outer sprocket rotatably mounted on the outer periphery of the drive plate. A chain then delivers power to a rear wheel of the cycle, such as the rear wheel of a bicycle.

The shift actuating mechanism of the cycle transmission may comprise a shift lever that is convenient to a rider and is connected to one end of a push-pull cable. At the other end, the cable is connected to a bullet positioning mechanism. The bullet positioning mechanism includes a shift shaft which is connected to the bullet and causes it to engage the detents of the desired adjacent cam gear as it disengages from the detents of the active cam gear. A timing cam is located on the drive plate to time and activate the bullet positioning mechanism at the appropriate timed intervals.

Timing

Shifting can only be initiated when the bottom of a valley section of one cam gear and the top of a peak section of an adjacent cam gear are in their shift start positions of rotation relative to each other. Therefore, shifting must be timed in a predetermined and consistent manner. The bottom of the valley section and the top of the peak section must be positioned every time at the same place relative to each other for the purpose of initiating a shift. This is accomplished by making the circumferences of the cam gears, the circumferences of the ring gears, and the number of peaks and valleys inside the cam gears all relative to each other.

Designing for shift initiation may start with reference to a timing mark on the drive plate. The ring gears and cam gears can be engineered to permit shifting at various positions. Where the cam gears are of equal diameter, a number one cam gear will be rotated by a number one ring gear which is that having the smallest circumference. For every rotation of the drive plate, the number one cam gear preferably rotates at least one time. If it rotates a fraction more than once, the fraction must be an integer multiple of the reciprocal of the number of cam segments in the cam gear. This is to ensure at least one shifting position per revolution of the drive plate.

For example, if the cam gear has six segments (i.e., six valley sections and six peak sections), the additional rotation must be at least one-sixth of a rotation or sixty degrees more than one revolution. This principle applies for each consecutive cam gear. Therefore, for every rotation of the drive plate, the number two cam gear must travel at least one-sixth, one-third (two-sixths), one-half (three-sixths), two-thirds (four-sixths), or five-sixths, and so on, more than the number one cam gear. The different amounts of rotation from one cam gear to the next adjacent cam gear, as well as the number of cam gears, all affect the positions at which the shift can be initiated.

To increase the amount of rotation of the number two cam gear in relation to the number one cam gear, more circumference is added to the number two ring gear so that the number two cam gear will have to travel the same angular distance as the number one cam gear plus an amount evenly divisible by the number of cam segments in the number two cam gear. When two shifting positions are desired in one rotation, the increase must also be evenly divisible by two.

For purposes of the following explanation, a peripheral mark at one end of an imaginary line across the drive plate, and from which the bottom of a cam valley of the number one cam gear is positioned perpendicularly, will be designated "0" degrees. Another mark at the other end of this imaginary line is at the opposite periphery of the drive plate and will be designated "180" degrees. With a one-third increase in rotation of the number two cam gear, a corresponding peak top of the number two cam gear and the valley bottom of the number one cam gear will consistently line up at the 0 and 180 degree marks. In other words, the number one cam gear valleys, the number two cam gear peaks, the number three cam gear valleys and so forth, line up at the 0 and 180 marks.

The cam gears and the number one ring gear may both have equal circumferences. If, for example, one-sixth more circumference is then added to the number two ring gear, it will cause its cam gear to rotate one-sixth more. If each subsequent ring gear is increased one-sixth more in circumference, this will allow the shift to be initiated at the same reference point (or angular position) on the drive plate every time. In this regard, an increase in the ring gear circumference is proportional to an increase in the ring gear radius. With knowledge of these measurements, the peak top and the valley bottom of adjacent cam gears will line up during gear rotation at predetermined points, and thus, timed shifting can be initiated whenever desired.

Only one set of detents is engaged at a time, and this set comprises at least one detent and corresponds to the "active" cam gear. At the start of a shift sequence, the detents associated with both cam gears adjacent to the active cam gear are preferably lined up substantially with the corresponding peaks of these cam gears (i.e., the detent apertures for every other cam gear are in line). The detents may line up differently with respect to the cam surfaces of the adjacent cam gears if the apertures in the drum are spirally offset or are in line for consecutive cam gears. If an upshift is started at the "0" mark, then the downshift will start at the same point that the upshift is completed, which is determined by the difference in rotation rates between adjacent and active cam gears and the number of cam segments in these cam gears.

AN IN-LINE EMBODIMENT OF THE INVENTION

Power Flow

An "in-line" arrangement of the invention comprises two gear shafts, namely a reducing gear shaft and a cam gear shaft. Each gear shaft has a group or set of gears which are centered on the shaft and arranged next to each other along the axis of the shaft. The reducing gear shaft has reducing gears permanently attached to the shaft, either by being machined from the same billet or by being bolted or keyed to the shaft. For purposes of this explanation, this reducing gear shaft will be referred to as the "input" shaft (although either shaft can be used as the input). The gears on the other shaft are cam gears capable of being locked to the shaft via an arrangement of detents that are reciprocated by a cam member. This cam gear shaft will be referred to as the output shaft in this explanation.

The two shafts and their corresponding gears are sized and arranged such that when the two shafts are rotatably mounted in their respective bearings, all of the gears on the input shaft continuously engage all of the gears on the output shaft.

Each pair of input and output gears, that is, the reducing gear on the input shaft in continuous engagement with the cam gear on the output shaft, has a different gear ratio than the adjacent pair of gears. In many applications, each pair of gears will have a different gear ratio than every other pair of gears in that particular transmission. Preferably, the gear ratios increase in one direction along the shaft and decrease in the other direction.

As stated above, all of the gear pairs are continuously engaged, and also the reducing gears are continuously engaged by or affixed to the input shaft. However, only one of the cam gears on the output shaft is locked to the output shaft via the detents for that gear pair. Power is transmitted from the input shaft to the output shaft via the one locked gear pair.

Power flow characteristics (speed and torque) through the transmission can be changed by unlocking an engaged cam gear from the output shaft and simultaneously locking a previously disengaged cam gear to it. This is a "gear shift".

Shifting Sequence

In this specification, the active gear pair is the pair of gears that is currently transmitting power. An upshift is a change in the active gear pair such that the ratio of the speed of the input shaft to the speed of the output shaft is a numerically smaller number, such as for example, a shift from the gear ratio of 5 to a gear ratio of 4 (input to output). A downshift is a change in the active gear pair such that the ratio of the speed of the input shaft to the speed of the output shaft is a numerically larger number, such as for example, a shift from the gear ratio of 4 to a gear ratio of 5 (input to output).

The shifting time and the sequence of detent movements are the result of the configuration of the cam surfaces on the cam gears, on the bullet member and on the bullet positioning cam element(s). The design and arrangement of the components that constitute the output shaft and the associated mechanism for moving the bullet also influence the shifting operation.

The following description of a shifting sequence will start with the transmission rotating and the active gear pair being a gear pair that is in the mid-range of the transmission. This means that the transmission is operating in a gear ratio from which it can be either upshifted or downshifted. The power flow enters through the input shaft and is modified in speed and in torque by the gear ratio of the active gear pair.

The active gear pair is locked to the output shaft because the bullet has been positioned under the detents for that gear pair, thereby forcing the corresponding detents radially outward into the open spaces formed by the cam valleys in the continuous cam surface cut into the inner periphery of the annular cam gear of the active gear pair. The detents are held in their outermost radial position in abutment with the bottoms of the cam surface valleys by the corresponding cam grooves of the bullet. Therefore, the cam gear and the output shaft are locked together with the cam gear engaged and driven by the reducing gear of the active gear pair.

All of the other detents for the gear pairs, other than the active gear pair, are not being held radially outward in position against the cam surface of their respective cam gears by the bullet. Any force acting between the detents and the cam surface of such an "inactive" cam gear has a radial component which will drive and/or keep the detents radially inward. Hence, the inactive cam gears are free to rotate relative to the output shaft while being continuously driven by the reducing gears.

Each detent may be held in its retracted position against the pull of centrifugal forces by a spring biased pin which is mounted within a laterally disposed bore in the wall of the drum adjacent to the corresponding detent aperture, and which engages a peripheral groove or ridge on the detent when the latter is in its retracted position. As an alternative (not shown), the bullet grooves may be undercut to provide overhanging lips and the foot of each detent may be provided with projecting ridges which engage the lips to trap the detents radially inward in order to ensure that they follow the bullet's grooved surface, and that they are held in their fully retracted position against centrifugal forces. However, such positive restraint is optional because when the inactive detents are off of the bullet cam surfaces, the inactive cam gears are free to rotate relative to the output shaft even if centrifugal forces cause the inactive detents to follow the cam surfaces of the inactive cam gears.

The inactive gear pairs adjacent to the active gear pair have gear ratios that are different from that of the active gear pair. Therefore, the cam gears on the output shaft that are adjacent to the active cam gear are rotating (advancing or regressing) relative to the active cam gear. Each adjacent cam gear is also rotating (advancing or regressing) relative to the output drum inside of it, that is, all of the cam gears that are inactive are moving relative to the output shaft, and their corresponding detents are all retracted into the inactive apertures of the drum of the output shaft. The magnitudes of these relative motions are different for each inactive cam gear and depend on the differences between the gear ratios of the active and the inactive cam gears.

The relative motion between the active cam gear and an adjacent inactive cam gear causes the peak sections of the cam surfaces of the inactive cam gear and its retracted detents in the output drum to periodically coincide or line up. When the peak sections of the cam surface and the detents for either of the cam gears adjacent to the active cam gear line up, then a gear shift can occur. More accurately, as the cam surface valleys and the detents for either cam gear adjacent to the active cam gear approach coincidence, the shift sequence can start. During the shift sequence, the engaged detents of the active cam gear must be allowed to retract in order for the shift to continue to take place. This is accomplished by the timed synchronous movement of the bullet.

For every rotation of the engaged cam gear, the adjacent higher speed cam gear rotates a fraction more than once. To ensure at least one shifting position per revolution, this fraction must be an integer multiple of the reciprocal of the number of cam segments in the cam gear. For example, if the cam gear has six segments (i.e., six valleys and six peaks), the additional rotation must be at least one-sixth of a rotation or sixty degrees more than one revolution. Therefore, for every rotation of the engaged cam gear, the adjacent higher speed cam gear must travel at least one-sixth, one-third (two-sixths), one-half (three-sixths), two-thirds (four-sixths), or five-sixths and so on, more than the engaged cam gear. This principle applies for each consecutive cam gear.

When two shifting positions are desired in one rotation, the fractional increase must also be a multiple of two. The different amounts of rotation from one cam gear to the next adjacent cam gear as well as the total number of cam gears all affect the positions at which the shift can be initiated.

Downshifting

A downshift requires that the cam gear of the adjacent gear pair having a numerically larger gear ratio be engaged by its detents substantially simultaneously while disengaging the detents of the active gear pair. Because the to-be-engaged gear pair has a numerically larger gear ratio, the to-be-engaged cam gear on the output shaft is rotating at a slower rate than the output shaft itself. Hence, the inactive detents in the apertures of the output shaft which are to be engaged with the to-be-engaged cam gear are rotating faster than the cam gear itself, and therefore, after a certain angle of rotation, these detents will be movable into the radially extended position required to be fully engaged with the valley sections of their cam gear.

When the inactive detents to be engaged with the to-be-engaged cam gear are aligned at or near the peaks of the cam surface forming the inner periphery of this cam gear, the shifting sequence can begin. The sequence of the detent movements is controlled by the cam surface of the to-be-engaged cam gear and synchronized by the bullet. At the beginning of the sequence, the bullet is moved toward the gear pair to be engaged. This movement accomplishes the following: (1) The detents for the to-be-engaged gear pair start to move radially outward into the space created by the valleys of the cam profile of the to-be-engaged cam gear, and (2) the bullet starts to move out from under the detents of the active gear pair, which allows the forces between the active detents and the active cam surface to force the active detents radially inward into the apertures in the drum of the output shaft.

During the disengagement of the active gear pair, that is, while the active detents are withdrawing, these detents are still in contact with the active cam surface for the active gear pair, as well as with the sides of the apertures in the drum and with the bullet, and are still transmitting torque to the drum and its output shaft. As these active detents are being withdrawn, the detents for the to-be-engaged gear pair are being forced radially outward against the cam surface of the to-be-engaged cam gear.

When the detents of the previously active gear pair have moved radially inward sufficiently to drop off of the cam surface peaks, they are no longer locking their cam gear to the output shaft. During substantially the same period of time, the to-be-engaged detents have moved into contact with the valleys of the cam surface of their cam gear. Since these latter detents are also engaged by the drum of the output shaft and by the bullet, they lock their cam gear to the output shaft and thereby make it the new active cam gear. The downshift is now complete.

The difference in rotation rates between the input and output shafts changes during the shifting process and this change is determined by the difference in the gear ratios of the two adjacent gear pairs involved in the gear shifting operation. The shifting operation is coordinated by axial movement of the bullet. The bullet must be moved out from under the detents of the active gear pair to allow the driving force on these detents to push them inward. At the same time, the bullet must push the detents of the to-be-engaged gear pair outward into contact with the cam surface valleys of the cam gear of that gear pair. The shapes of the axially extending cam surfaces defined by the grooves of the bullet, the cam surfaces of the cam gears and the cam following surfaces of the detents all influence the characteristics of the shift and are selected to provide a smooth transition between adjacent gear ratios.

For a downshift, the final output shaft rotation rate will be slower than the rotation rate before the shift, and the output shaft will start to slow immediately when the shift sequence starts. This is because as the active detents start to withdraw, they slide radially inwardly along the cam surface of the engaged cam gear causing the output shaft to rotate more slowly than this cam gear. Both sets of detents continue to move until the to-be-engaged detents reach their fully extended position where they lock their cam gear to the output shaft, at which time the output shaft rotation rate is that determined by the gear ratio of the newly active gear pair. The manner in which the rotation rate of the output shaft changes during a downshift can be varied from application to application by changing the shape of the cam gear segments and the shape of the bullet grooves as well.

Upshifting

An upshift requires that the adjacent gear pair which has a numerically smaller gear ratio be engaged while simultaneously disengaging the active gear pair. The upshift is similar to the downshift except that the cam gear on the opposite side of the active gear pair is the one to be engaged and the cam gear for the to-be-engaged gear pair is rotating faster that the output shaft. A further difference is that the detents of the to-be-engaged cam gear approach their cam valleys from the opposite side as compared to a downshift. In other words, each of the inactive detents for the to-be-engaged gear pair will slide outwardly along the opposite incline section leading to the V or U shaped valley section of the corresponding cam gear.

Similar to the downshift sequence, the output shaft will initially start to slow down immediately when the upshift shift sequence starts. This is because as the engaged detents start to withdraw, they also slide inwardly along the cam surface of the cam gear to be disengaged causing the output shaft to rotate more slowly than the cam gear. Both sets of detents continue to move until the to-be-engaged detents reach their fully extended positions and the previously engaged detents reach their fully retracted positions. At this time, the newly active detents are fully inserted in their cam gear valleys and thereby lock their cam gear to the output shaft, at which time the output shaft is accelerated to its new faster rotation rate as determined by the gear ratio of the newly active gear pair.

The manner in which the rotation rate of the output shaft changes during an upshift also can be varied from application to application by changing the shape of the cam gear segments and the shape of the bullet grooves, as well as by changing the timing of the bullet and detent movements. In addition, a heavy duty bullet and bullet shifting mechanism may be used to make the to-be-engaged detents approach their cam valleys from the same side as in a downshift, thereby reducing or eliminating the above described deceleration/acceleration phenomenon.

BRIEF DESCRIPTION OF THE DRAWINGS

The invention may be further understood from consideration of the detailed description below taken in conjunction with the accompanying drawings in which.

DETAILED DESCRIPTION OF THE INVENTION

Bicycle Embodiment

Figure 1:
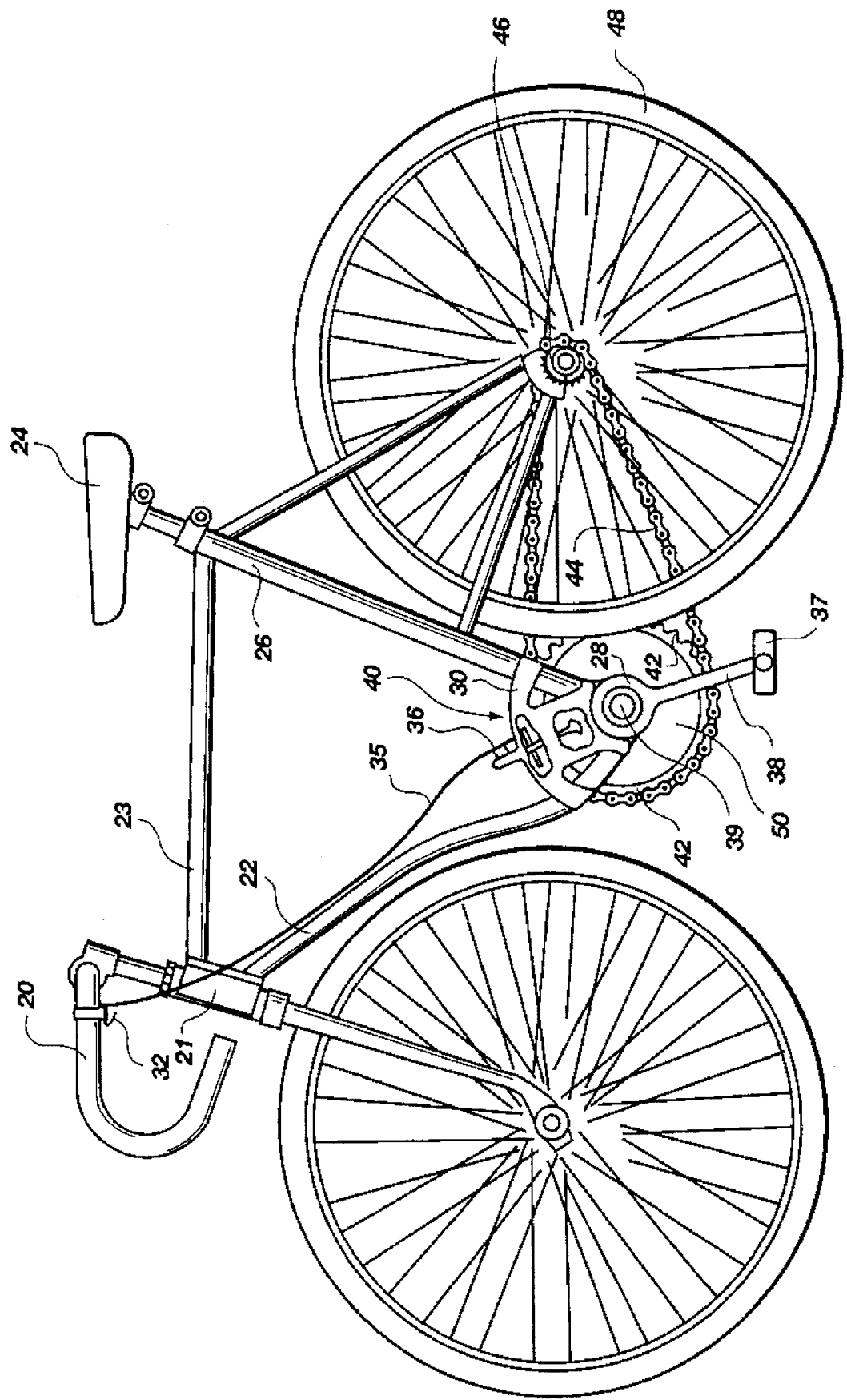
FIG. 1 is a left side elevational view of a man's bicycle provided with a gear shifting mechanism according to the present invention.
Figure 2:
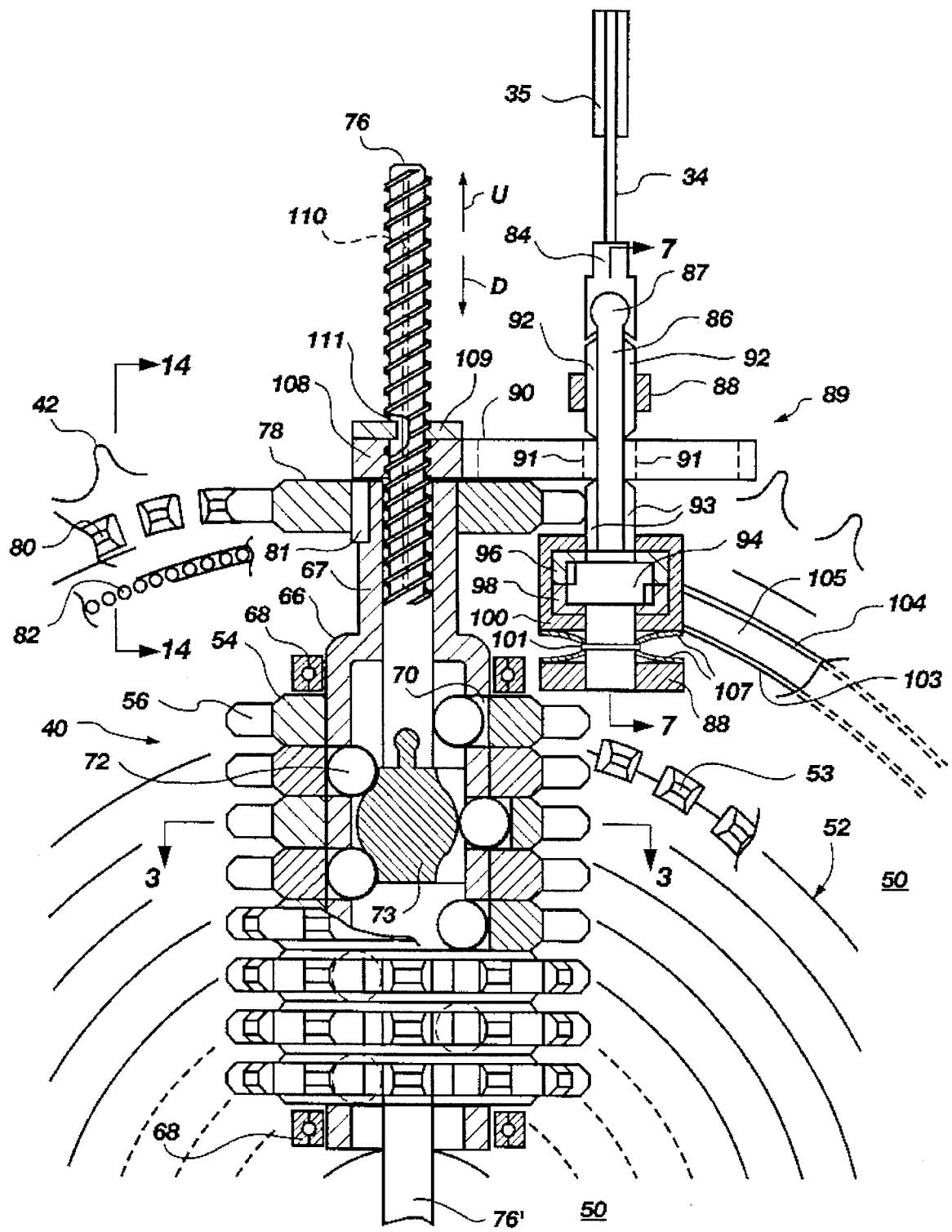
FIG. 2 is a fragmentary side elevational view in partial cross section of the gear shifting mechanism of FIG. 1.

FIG. 1 shows a side elevational view of a man's bicycle with handle bars 20 on top of a headtube 21 connecting a top tube 23 and a down tube 22. A seat 24 is on top of a seat tube 26. Adjacent to the bottom bracket 28 between down tube 22 and seat tube 26, and mounted to the seat tube and down tube, is the housing 30 of a gear change mechanism 40 according to the invention. Attached to the handle bars 20 is a push-pull type of gear shifting lever 32. Attached to lever 32, and running along and down the down tube 22 to the gear change mechanism 40, is a push-pull cable 34 within a sheath 35 (FIG. 2). The sheath 35 is supported on housing 30 by a bracket 36.

A pedal 37 is attached to the radially outward end of a crank arm 38. The crank arm 38 is affixed to and rotates with a crank shaft 39 rotatably mounted within bottom bracket 28. The crank shaft 39 is affixed to a drive plate 50, which drives the gear change mechanism, generally designated 40. The gear change mechanism 40 in turn drives an annular sprocket 42, which drives a chain 44, which in turn rotates a rear sprocket assembly 46 for driving rear wheel 48 in the forward direction while permitting free wheeling of rear wheel 48 when it is not being driven.

As shown in FIG. 2, a series of eight concentric ring gears 52 having varying circumferences are affixed to or formed in the drive plate 50. Each of the eight ring gears 52 contact and engage a corresponding one of eight output cam gears 54 by means of uniform ring gear teeth 53 and identical matching teeth 56 on the outer circumference of the cam gears. The teeth 56 of cam gears 54 may be typical of those on spur gears.

Figure 3:
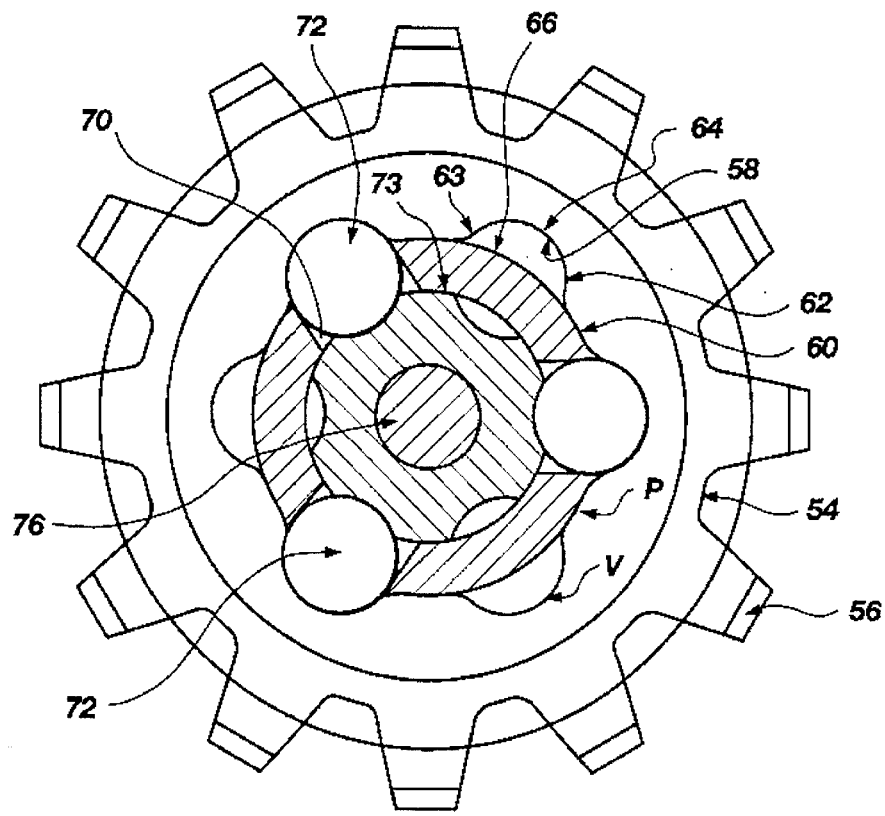
FIG. 3 is a cross-sectional view taken along line 3—3 of FIG. 2 and showing a cam gear with six repeating cam segments.

Each of the cam gears 54 has an annular configuration with an inner peripheral cam surface 58. As shown in FIG. 3, the cam surface 58 may comprise six identical cam segments each having a peak section 60 and a valley section 64 interconnected by an incline section 62. Each valley section 64 has a bottom V and is connected to the peak section of an adjacent segment by a connecting incline section 63. The tops P of the peak sections 60 define the inner diameter of the cam gear, and it is upon these peak tops that the cam gears are supported for rotation around the outer circumference of a drum 66. In other words, the peak tops P define the minimum diameter of the inner circumference of the cam gear 54, and it is upon these peak tops that the cam gears are supported for rotation by the outer surface of the drum 66, which is an integral portion of an output shaft 67.

The drum 66 is mounted for rotation at both ends by bearings 68, 68. These bearings also retain the cam gears in their proper lateral positions along the length of the drum 66. The drum 66 is hollow and has eight sets of three apertures 70 each set corresponding to one of the eight cam gears, which gives a total of twenty-four apertures (3×8=24). The apertures 70 extend from the inner drum surface to the outer drum surface and each contains a corresponding detent 72. The radially inward surfaces of any one set of the detents may simultaneously be in contact with a bullet 73.

The bullet 73 comprises six outer cam surfaces in the form of grooves 74 (FIG. 5), the radial depth of which varies along the axis of the bullet and upon which the detents ride when engaged and when being engaged or disengaged. The bullet is supported for translational movement within the drum 66 by a screw shaft 76 at one end and a shaft extension 76' at the other end, such that it has reciprocal axial movement back and forth along the drum axis. The disengaged detents ride on either the screw shaft 76 or its extension 76', depending on the axial position of the bullet 73.

The axial movement of the bullet is regulated by the screw shaft 76 as illustrated in FIG. 2. A drive gear 78 is keyed to a hollow output shaft 67 extending axially from one end of the drum 66. Drive gear 78 is preferably a spur gear with the same outer tooth profile as the cam gears 54. The drive gear 78 continuously engages a driven ring gear 80 on the annular drive sprocket 42. The driven ring gear 80 is affixed to or formed in the annular drive sprocket 42 and has a structure similar to the driving ring gears 52.

Figure 14:
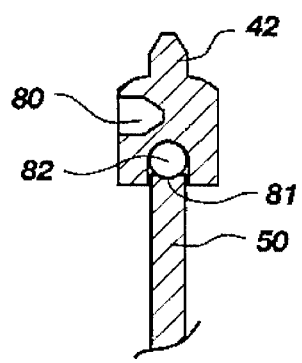
FIG. 14 is a fragmentary cross-sectional view of the drive sprocket and the outside edge of the drive plate taken along the line 14—14 of FIG. 2; and, FIG. 15 is a cross-sectional view of the drum member of FIG. 11 showing details of a spring biased catch mechanism for restraining inactive detents against centrifugal forces.

The annular drive sprocket 42 rotates independently of the drive plate 50 and its inner perimeter fits over the outer perimeter of drive plate 50 on both sides thereof to form an inverted U shape as seen in FIG. 14. The bottom of the U shape holds a plurality of small ball bearings 82 which ride in a race 81 formed on the outer edge of the drive plate 50. The legs of the U shape extend radially inward, past the outer perimeter of the drive plate to define a cage for the ball bearings.

Figure 7:
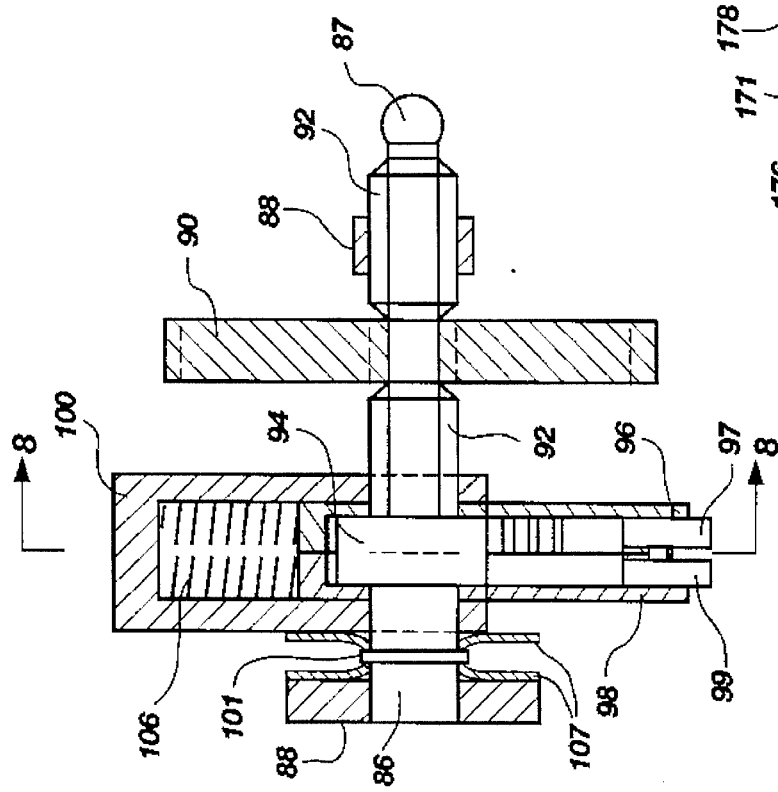
FIG. 7 is an enlarged cross-sectional view of the gear shifting control mechanism of FIG. 2.

The push pull cable 34 is connected to a female cable end piece 84, which in turn in attached to a shift actuator shaft 86 by a male ball end 87. Shift actuator shaft 86 is supported so as to provide rotation around its longitudinal axis and reciprocal axial movement along this axis, such as by a pair of bushings 88 which are attached to housing 30. As shift actuator shaft 86 is pushed along its axis, it engages keyways 91, 91 in a shift actuator gear 90 by means of two pairs of opposing fixed keys, namely an upper pair 92, 92 and a lower pair 93, 93 which are on opposite sides of gear 90. The shift actuator shaft 86 also includes an actuator pinion 94 enclosed within a rack housing 100. When the shift actuator shaft 86 is moved along its axis, the pinion 94 causes lateral movement of an upshift rack 96, a downshift rack 98 and the rack housing 100. The shift racks 96 and 98 are also supported for longitudinal reciprocating movement in the rack housing 100 as may be seen best in FIG. 7. Rack housing 100 thus provides both reciprocal lateral movement and reciprocal longitudinal movement of the shift racks.

Figure 8:
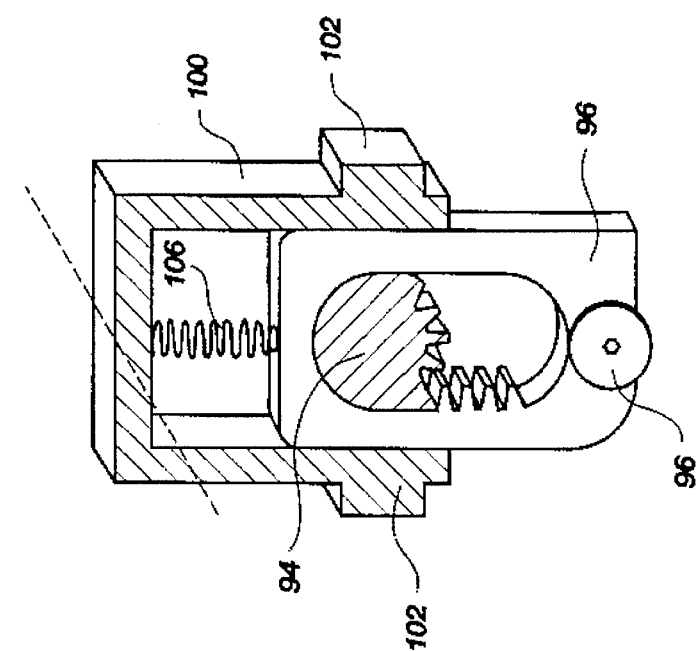
FIG. 8 is a cross-sectional perspective view of parts of the gear shifting control mechanism of FIG. 7.

The direction of lateral rack housing movement in response to axial movement of shaft 86 is parallel to the surface of the drive plate 50. Housing 100 is supported for such lateral movement by means of keys 102, 102 which extend along opposite sides of the housing as shown in FIG. 8. Keys 102, 102 engage corresponding keyways formed by brackets (not shown) mounted on housing 30, and allow the shift racks to move laterally back and forth along the axis of the shift actuator shaft 86 between a downshift position over an annular downshift cam 103 and an upshift position over an annular upshift cam 104 (FIG. 2). Cams 103 and 104 are mounted or formed on the face of drive plate 50, and are separated by a neutral zone 105 corresponding to a neutral position of the shift racks.

In the pushed position of the cable 34, the downshift rack 98 and its roller 99 move over and in line with the downshift cam 103 which is affixed to the surface of drive plate 50. In the pulled position of the cable 34, the upshift rack 96 and its roller 97 move over and in line with the upshift cam 104, which runs parallel to and concentric with downshift cam 103 around a peripheral portion of the drive plate. Each of the shift racks is held against its corresponding annular cam by a rack spring 106, and is returned to its neutral position over neutral zone 105 by a corresponding one of a pair of spring disks 107, 107 that engage an annular rib 101 on shift shaft 86.

The shift actuator gear 90 has teeth on its outer circumference that engage the teeth of a shift collar 108. The center hole of shift collar 108 is threaded to receive the threaded screw shaft 76 connected to bullet 73. Shift collar 108 is held from moving laterally away from drive gear 78 in the direction of the screw shaft axis by a guide member 109 fixedly mounted on housing 30. Guide member 109 may be bolted or welded (not shown) to the housing and has a key 111 formed on its inner periphery and projecting radially inward so that it slides in an elongated slot 110 in screw shaft 76 as shown by a broken line in FIG. 2. Key 111 engages slot 110 to prevent rotation of screw shaft 76 with collar 108, such that clockwise rotation of collar 108 (as viewed from the distal end of shaft 76) drives screw shaft 76 radially outward and counterclockwise rotation of collar 108 drives screw shaft 76 radially inward.

When the bicycle is ridden, the pedal 37 transfers torque through the crank arm 38 to the crank shaft 39, which rotates drive plate 50. The ring gears 52 rotate all of the cam gears 54 but only the cam gear which is directly over the central portion of the bullet is engaged by its detents so as to transfer torque to the output shaft 67. These engaged detents transfer torque from the inner cam surface of the corresponding cam gear to the aperture walls within drum 66, which in turn drives the output shaft 67. Output shaft 67 engages drive gear 78 through a key 81 and thus rotates the drive gear 78 in engagement with outer ring gear 80, which in turn rotates the outer sprocket 42, which drives the chain 44, which rotates the rear sprocket 46, which drives the rear wheel 48.

Downshifting

A gear downshift is initiated by pushing lever 32 on the handle bars, which pushes the cable 34 radially inward toward the crank shaft 39, which pushes shift actuator shaft 86 radially inward to simultaneously engage the shift actuator gear 90 and move the rack housing 100 inward, thereby positioning the downshift rack 98 over the downshift cam 103. Downshift cam 103 can temporarily delay the radially inward movement of the downshift rack if this cam is not at its low point. The downshift cam 103 pushes the downshift rack 98 away from plate 50, thereby causing the rack gears to engage the gears of pinion 94.

FIG. 8 shows the upshift rack 96. As evident from FIG. 7, the downshift rack 98 is on the opposite side of housing 100 and causes pinion 94 to rotate clockwise (as viewed from the proximal end of shaft 86) because the teeth of racks 96 and 98 face in opposite directions. The shift actuator shaft 86 and actuator gear 90 obviously rotate in the same direction as its pinion 94 and therefore cause screw shaft collar 108 to rotate counterclockwise so as to force the screw shaft 76 radially inward in the direction of arrow D (FIG. 2). This in turn causes bullet 73 to begin traveling inward. As the bullet 72 begins to move inward, it releases the engaged detents from their corresponding valleys and moves them along the cam surface of their cam gear, while simultaneously lifting the detents of the adjacent lower cam gear into their engaged position as illustrated in FIGS. 9A–9F.

Upshifting

An upshift is initiated by pulling the lever 32 which pulls the cable 34, which pulls the shift actuator shaft 86, which engages the shift actuator gear 90 and lines up the upshift rack 96 over the upshift cam 104. The cam 104 lifts the upshift rack 96 away from plate 50 and causes it to engage pinion 94. Pinion 94 now rotates counterclockwise, which rotates the shift actuator gear 90 counterclockwise, which in turn rotates the screw shaft collar 108 clockwise so as to cause the screw 76 and the bullet 73 to move outward in the direction of arrow U (FIG. 2). This causes drum 66 to engage the adjacent higher gear. The radial placement and axially projecting shape of the upshift and downshift cams 103 and 104 are selected along with the shapes of the cam surfaces of the cam gears and bullet to achieve the desired timing for smooth shifting without binding.

Figure 4:
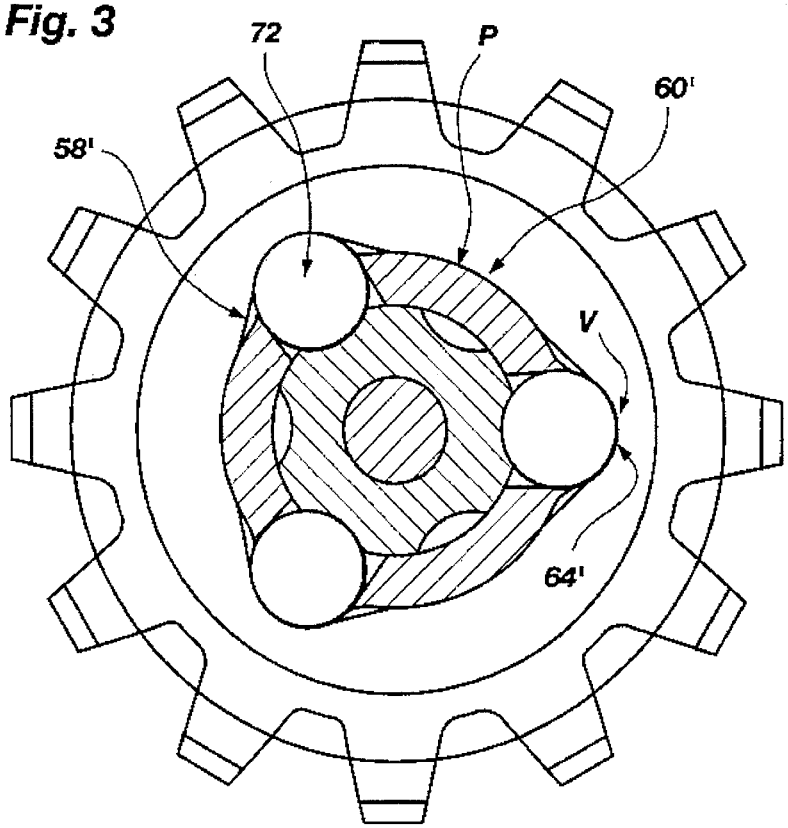
FIG. 4 is a cross-sectional view showing a modification of FIG. 3 in which the cam gear has three repeating cam segments.

FIG. 4 shows a cross-sectional view of a cam gear embodiment with a cam surface having only three segments instead of the six segments of the FIG. 3 embodiment. Preferably, the number of cam surface segments in each of the cam gears is an integer multiple of the number of detents in the radial plane that is common to the cam gear and its corresponding detents. For example, the multiple is one in the embodiment of FIG. 4, and the multiple is two in the embodiment of FIG. 3.

Another difference between these two embodiments is that the peak top P of the embodiment of FIG. 3 is at an apex formed by the peak section 60, while the peak top P' of the embodiment of FIG. 4 does not have this characteristic. Instead, the peak top P' of the FIG. 4 embodiment is the midpoint of the peak section 60', the latter being the portion of cam surface 58' that comes closest to the rotational axis of the drum means. The peak section may therefore include parts of the cam surface on either side of the peak top. Thus, the term "peak section" as used in describing the present invention means that portion of the cam surface in contact with the outer surface of a drum means, such as drum 66.

Similarly, the valley section 64' of the FIG. 4 embodiment is that portion of the cam surface 58' in contact with the fully seated detent 72, and the valley bottom V is the midpoint of the valley section. The valley section may therefore include parts of the cam surface on either side of the valley bottom.

Figure 6:
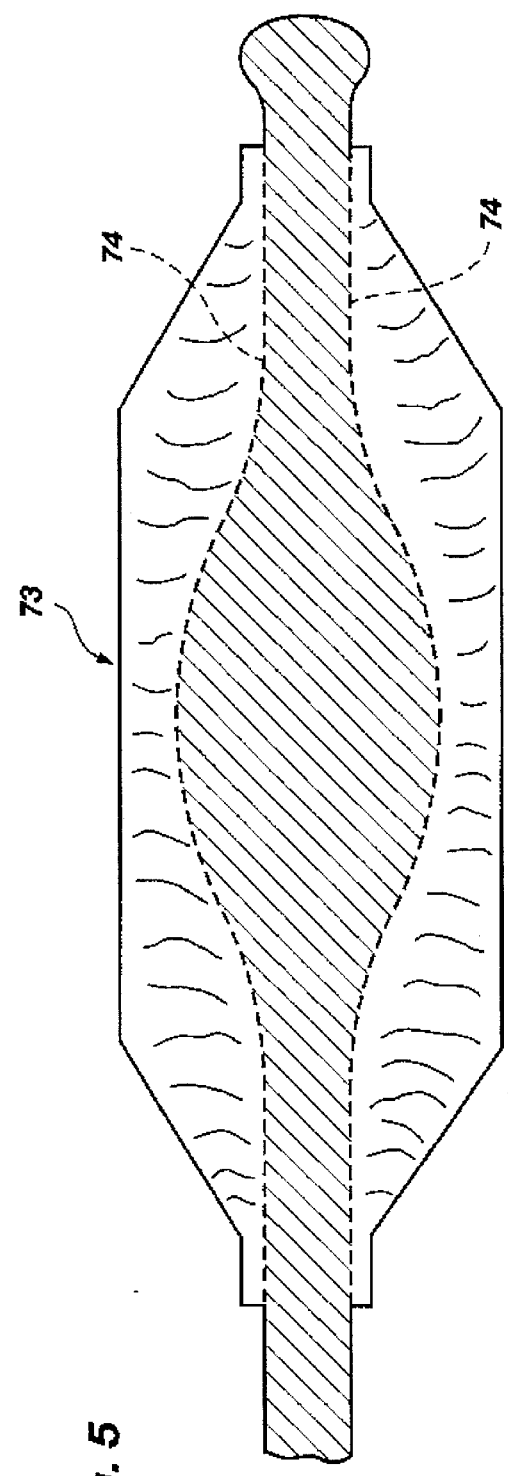
FIG. 6 is a cross-sectional view of the bullet member taken along line 6—6 of FIG. 5.
Figure 5:
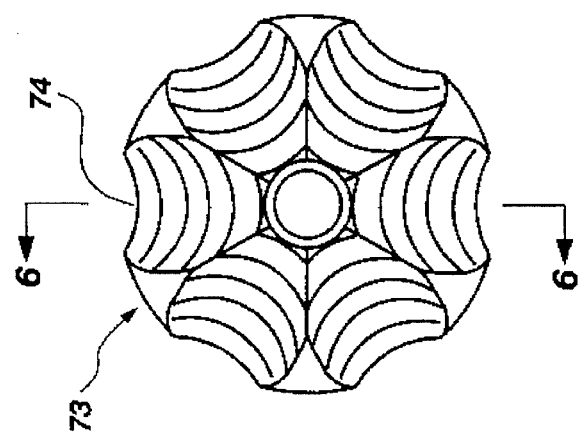
FIG. 5 is an end view of the bullet member of FIGS. 2-4.

FIG. 5 shows an end view of the bullet 73, with contour lines illustrating the varying amounts of line contact that may occur between the detents and the bullet as the detents move up and down the cam surfaces provided by grooves 74 of the bullet 73. FIG. 6 shows a cross-sectional side view of the bullet 73 illustrating the sloped cam surfaces of the top and bottom grooves 74, 74. Thus far, this specification has described a bullet with longitudinal cam grooves and which translates along its longitudinal axis to complete a shift, as shown in FIGS. 5 and 6. However, other bullet configurations are possible.

Any bullet configuration which defines the required radial detent motion for any other corresponding bullet motion is acceptable and may have other advantages. For example, the longitudinal cam grooves, which define radial detent motion for corresponding longitudinal translation of the bullet, could instead be cut circumferentially around the outer periphery of a bullet member extending the length of the drum cavity so as to have the bullet produce a shift upon rotation rather than translation. As a further alternative, the cam grooves could follow a corkscrew configuration, for which screw-like rotation and translation of the bullet would produce a shift. In addition, the solid mechanical bullet could be completely replaced by a hydraulic fluid arrangement in which the detents are mounted in corresponding cylinders and are actuated like pistons to provide proper radial detent movement.

Gear Shifting Principles

FIGS. 9A–9F and 10A–10F illustrate diagrammatically the relationship of the cam gears, detents, and drum in their respective rotations and movements during gear shifting operations. The shapes of the detents and cam gear surfaces of FIGS. 9A–9F and 10A–10F differ from those of FIGS. 2 and 11, and are shown as examples of varying structural modifications. However, the angles and relative movements shown also apply to the ball detents and sinusoidal cam gear surfaces in FIGS. 2–4 and 11.

The object of a gear shift is to change the input to output gear ratio, and in the present invention this is accomplished by disengaging a set of detents from the cam valleys of one cam gear, while simultaneously engaging another set of detents into the cam valleys of an adjacent cam gear. This exchange of engaged cam detents changes the rotational gear ratio of the output drum shaft 67 relative to the input shaft 39, and therefore constitutes a gear shift.

There are two fundamentally different methods of sequencing and controlling the timing of this gear ratio change.

Gear Changing Method No. 1

The first method is where the bullet movement is mechanically linked to the cam gear rotation. In other words, movement of the bullet is mechanically geared to the rotation of the transmission, such as is described above with respect to FIG. 2. In this embodiment, the axial movement of the bullet is directly proportional to the rotation of the screw shaft 76. Rotation of the screw shaft is in turn determined by the shape of the shift cam surfaces that drive the shift racks 96 and 98. The following discussion is for any such configuration that uses the first gear changing method to control and sequence the gear ratio change.

The first method precisely controls the travel of the bullet relative to the rotational displacement of the cam gears and, in conjunction with the profiles of the interrelated cams, controls the withdrawal and insertion movement of the detents relative to the rotational displacement of the cam gears. Further, the shape of the cam surfaces on the cam gears and the shape of the cam surfaces on the bullet are such that, during the transition from one gear ratio to another, there is a minimum of clearance (and no interference) between the detents on the one hand and the cam surfaces of the cam gear and bullet on the other hand. This close control of tolerances minimizes backlash when torque reversals occur during a gear shift.

There are several strategies that can be used to (1) design how the bullet moves and (2) determine the shape (profile) of the cam surfaces on the bullet and the cam gears. One strategy is to shape the cam gear surfaces and the bullet cam surfaces such that the detent travel (inward and outward) is linear with respect to the rotational angle of the cam gears. That is, for each unit of rotation of the cam gear, the detent will move radially an increment, where that increment is substantially constant over the entire range of the gear shift. Other relationships are possible and in some cases desirable. For example, when the detents for the active gear set move inward, the drum and its output shaft slow relative to the active cam gear. This effect can be enhanced or minimized by combinations of the bullet movement, bullet cam surface profiles and cam gear cam surface profiles.

More specifically, the upshift sequence can be modified such that the active cam gear detents are held securely in the cam gear valley while the to-be-engaged cam gear detents move outward. When the to-be-engaged detents are close to fully extended, the active gear detents are withdrawn. Thus, the output shaft rotation rate will not decrease significantly prior to the upshift increase. Also, the initial slowing characteristic can be enhanced during a downshift to smooth the decrease in rotation rate during a downshift. This is accomplished by shaping the cam surface HS1 such that the drum to gear HG relative rotation rate is continuously variable for detent travel from the valley bottom to the peak top.

If the application for the transmission is such that the transition rate from one gear ratio to another is not especially important, then the configuration of the shift cams (up or down), the bullet cam profiles, and the gear cam profiles can be shaped for ease of manufacturing.

FIGS. 9A–9F illustrate a gear shift from a higher speed cam gear HG (low ratio) to a lower speed cam gear LG (high ratio), which is a downshift cycle caused by driving bullet shaft 76 in the direction of arrow D (FIG. 2). As may be seen in FIGS. 2 and 11, all of the gear rotations are fixed relative to the input shaft rotation. When a downshift cycle commences, the drum portion 66 of the output shaft 67 is locked to and rotating with the faster rotating cam gear HG due to the engaged detents HD (HIGH SPEED CAM GEAR DETENTS). The disengaged detents LD (LOW SPEED CAM GEAR DETENTS) inside the to-be-engaged slower rotating cam gear LG are rotating faster than the cam gear LG itself.

As the bullet moves out from under the detents HD, the detent to bullet force decreases allowing the detent to cam gear force "F" (FIG. 9A) to push the detents HD radially inward so that they slide along cam surfaces HS1 (HIGH SPEED GEAR CAM SURFACE NO.1), and are released from the faster rotating cam gear HG. Simultaneously, the detents LD, by means of the bullet 73, are forced radially outward and slide down cam surfaces LS1 (LOW SPEED GEAR CAM SURFACE NO. 1) until they reach the bottoms V of the cam valleys. The detents HD will slide radially inward just as fast as cam surfaces LS1 will let the detents LD slide radially outward. These movements are synchronized by the axial travel speed and the cam surfaces of the bullet 73.

As the bullet 73 is moved axially, the detents HD are allowed to move inward, which slows down the drum rotation and simultaneously slows down how fast the detents LD move outward. The relationship between force F and resistance R along cam surfaces HS1 move the detents HD all the way in. Simultaneous axial movement of the bullet 73 moves the detents LD all the way out in order to complete a gear shift. All of this simultaneous movement effects the output drum rotation and the number of degrees that the input shaft must rotate to complete a shift.

The ability to predetermine the alignment of the valleys of the engaged cam gear with the peaks of an adjacent unengaged cam gear for the purpose of initiating a shift is a product of, and timed with reference to, the angular rotation of the input shaft or drive plate. If the lower speed cam gear LG travels X degrees for each rotation of the input shaft, then the higher speed cam gear HG travels X+YX degrees where Y is a variable parameter determined by the ratio between pairs of adjacent gears. If these gears traveled at the same angular velocity (Y=O), there would not be an opportunity for a gear shift. It is the difference between the angular rotations caused by the difference in the gear ratios of adjacent cam gears that determines the shift interval. Thus, (X+XY)–X represents the difference between the arcs traveled by adjacent cam gears for each revolution of the input shaft.

Figure 9A:
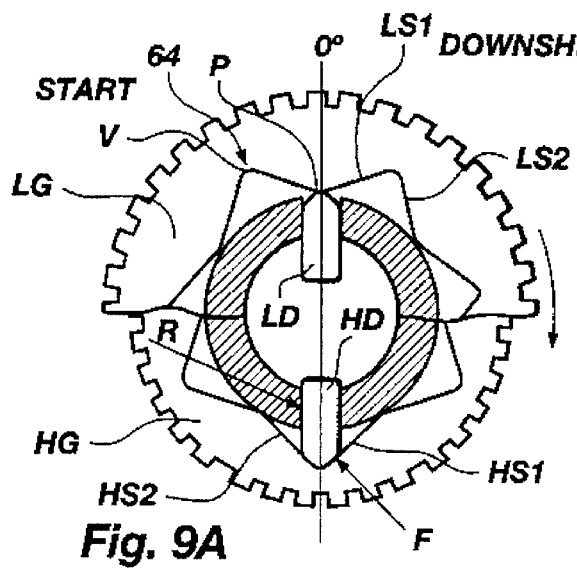
FIGS. 9A to 9F represent a pictorial example of one possible relationship between the cam surfaces of two adjacent cam gears, their respective detents and the drum during a downshift cycle of the gear shifting mechanism.
Figure 9B:
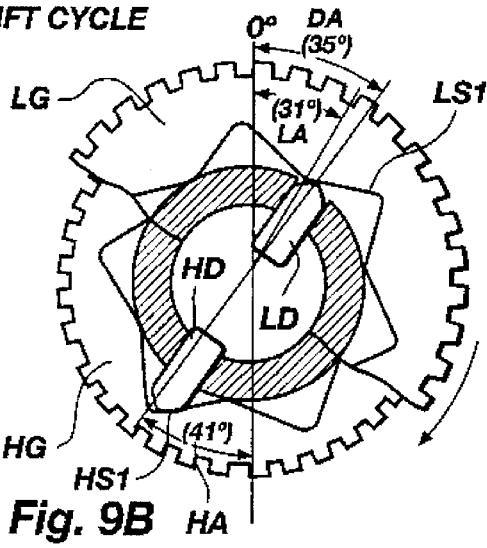
Figure 9C:
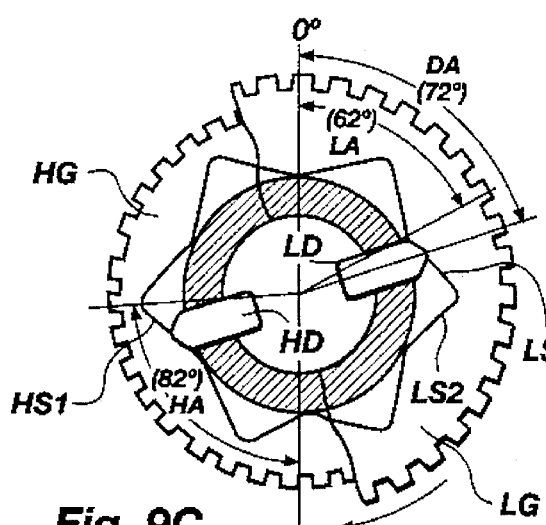
Figure 9D:
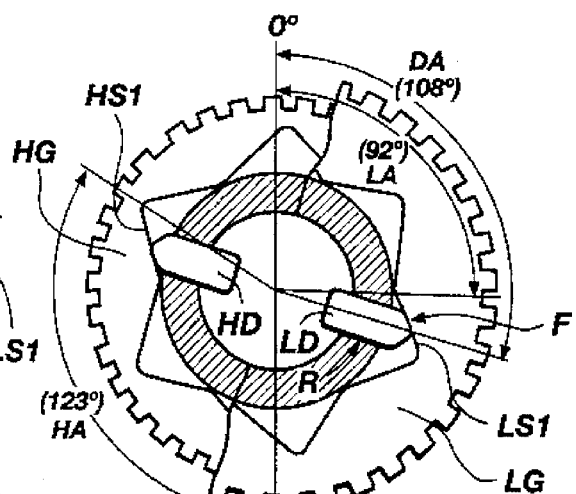
Figure 9E:
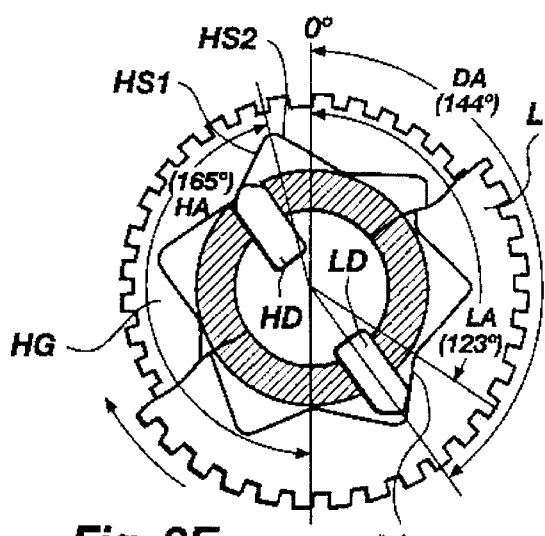
Figure 9F:
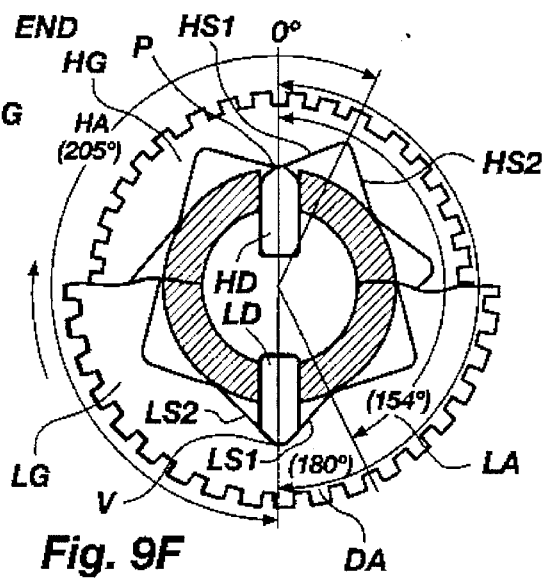
Figure 10A:
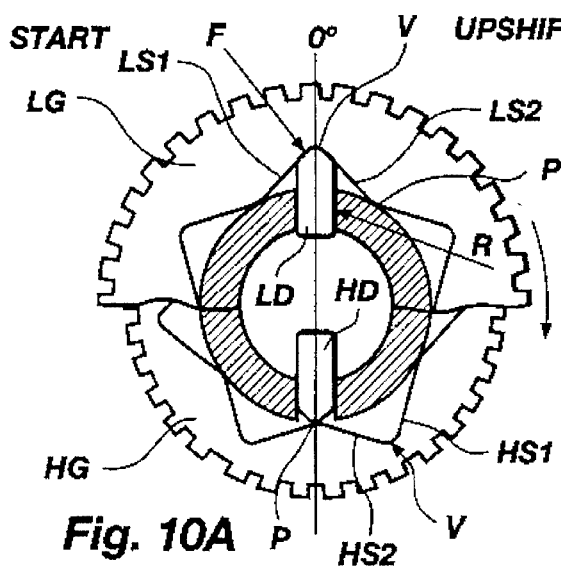
FIGS. 10A to 10F represent a pictorial example of one possible relationship between the cam surfaces of two adjacent cam gears, their respective detents and the drum during an upshift cycle of the gear shifting mechanism.
Figure 10B:
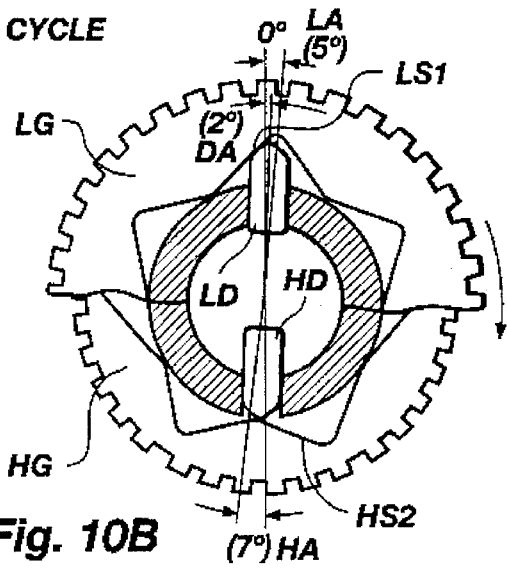
Figure 10C:
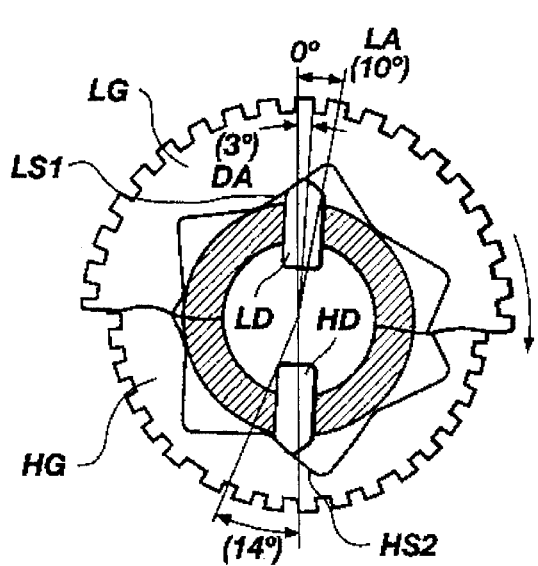
Figure 10D:
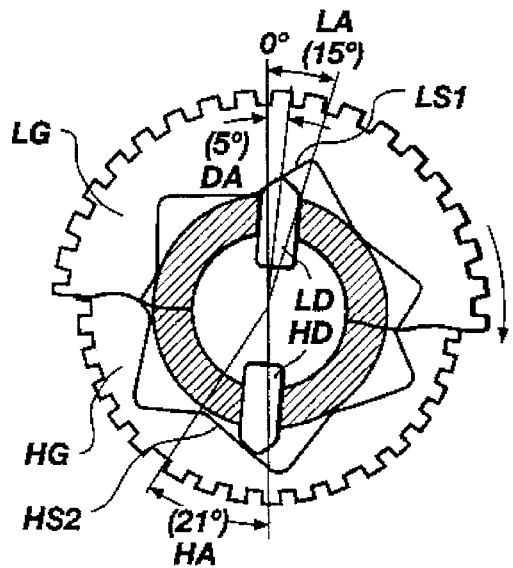
Figure 10E:
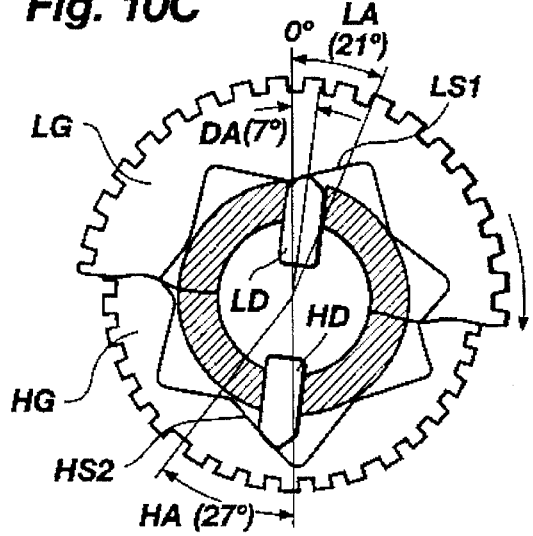
Figure 10F:
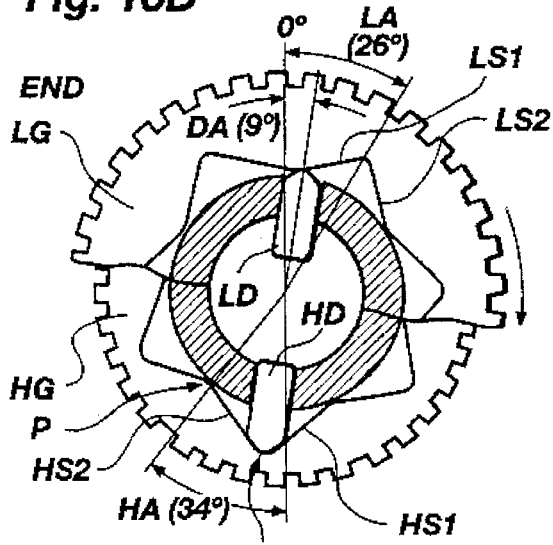

FIGS. 9B–9F include an illustrative example of the relative angular changes in the drum angle DA, the low speed cam gear angle LA and the high speed cam gear angle HA during a downshift cycle. In the non-limiting example shown in these figures, drum angles DA of 35 degrees, 72 degrees, 108 degrees, 144 degrees, and 180 degrees may correspond to high speed cam gear angles HA of 41 degrees, 82 degrees, 123 degrees, 165 degrees, and 205 degrees, respectively, and to low speed cam gear angles LA of 31 degrees, 62 degrees, 92 degrees, 123 degrees, and 154 degrees respectively. The gear shift is complete when the detents HD are at the peak tops P of high speed cam gear HG and the detents LD are at the valley bottoms V of low speed cam gear LG (FIG. 9F).

FIGS. 10A–10F illustrate a gear shift from a lower speed cam gear LG (high ratio) to a higher speed cam gear HG (low ratio), which is the upshift cycle caused by driving bullet shaft 76 in the direction of arrow U (FIG. 2). Initially, the drum portion 66 of the output shaft 67 is rotating with the cam gear LG by means of the engaged detents LD. Therefore, the drum portion of the output shaft and the disengaged detents HD rotate slower than the cam gear HG. As the bullet moves out from under the detents LD, the force F and the resistance R push the detents LD radially inward, causing them to slide along cam surfaces LS1 until they are released from the cam gear LG.

Thus, prior to the start of the gear shift, the drum and output shaft were locked to the cam gear LG and hence were driven at the lower speed rotational rate. When the detents LD withdraw, they slide along cam surface LS1, which allows the drum and output shaft to rotate relative to the cam gear LG, thereby slowing the drum rotation rate. The rate at which detents LD withdraw depends on the rate at which detents HD are inserted along cam surface HS2. In the upshift cycle, the movement of detents HD in response to the bullet movement thereby controls the other movements required for the shift.

If the lengths (or subtended angles) of cam surfaces HS2 and LS1 were equal, the shift would have to finish (in a rotational sense) the instant that it started. That is, the drum output shaft would be in the same position at the finish as at the start of the shift. This is because in the upshift cycle, the detents HD travel negatively with respect to their cam gear, i.e., the outwardly moving detents HD also move rotationally relative to cam gear HG in the angular direction opposite to the direction of rotation of this gear. It therefore is important for the length of cam surface HS2 to be longer than the length of cam surface LS1 to allow time for upshifting. The difference in length between cam surface HS2 and cam surface LS1 corresponds to the difference in gear ratios between lower speed cam gear LG and higher speed cam gear HG.

FIGS. 10B–10F include an illustrative example of the relative angular changes in the drum angle DA, the lower speed cam gear angle LA and the higher speed cam gear angle HA during an upshift cycle. In the non-limiting example shown in these figures, drum angles DA of 2 degrees, 3 degrees, 5 degrees, 7 degrees and 9 degrees may correspond to high speed cam gear angles HA of 7 degrees, 14 degrees, 21 degrees, 27 degrees and 34 degrees, respectively, and to low speed cam gear angles LA of 5 degrees, 10 degrees, 15 degrees, 21 degrees, and 26 degrees, respectively.

There are many manipulations that can be done to modify this relationship, one of which is to modify the cam surfaces of the bullet. It is preferable that the length and shape of all cam surface segments have such a relationship that the cam surfaces of the bullet may be symmetrical. Otherwise, a more sophisticated version of the bullet must be used.

The cam surfaces LS1, LS2, HS1 and HS2 have the following relationship to the peak section 60, the incline sections 62 and 63 and the valley section 64 (FIG. 3) of each cam gear. The valley section 64 is that portion of the cam surface 58 in contact with a detent in its fully extended (inserted) position, and therefore may include parts of the cam surfaces adjacent to the valley bottom V. The peak section 60 is that portion of the cam surface 58 in contact with the drum surface, and therefore may include parts of the cam surfaces adjacent to the peak top P (e.g., the FIG. 4 embodiment). The incline sections 62 and 63 are those parts of the cam surfaces between the valley section and the respective peak sections.

Gear Changing Method No. 2.

The second gear changing method is where the axial movement of the bullet is not mechanically linked directly to the rotation of the other components of the transmission. In this embodiment, the cam surfaces on the bullet at the center portion of its axial extent is substantially flat such that the radial force between the detent and the bullet cam surface does not have a component in the axial direction of the bullet. Hence, the bullet will stay in position under the detents until an axial force is applied to the bullet. When the bullet is moved axially toward either end portion where the bullet cam surface has a slope, the force applied by the detent to the bullet will have an axial component and this force will tend to move the bullet axially. When the slope of the cam surface on the bullet is steep enough, the axial force on the bullet will be sufficient to complete the shift. Thus, the shift may be accomplished without any external force except that required to move the bullet off-center.

In this method, the axial movement of the bullet is controlled by the shape of the cam surfaces on the two cam gears and of the cam surfaces on the bullet. If the gear ratios are the same as in the first method, and the bullet and the cam gears have the same cam surface shape as for the first method, then the motions of the cam gears, the detents and the output shaft will be substantially the same as where the bullet movement is controlled by a screw shaft. The reason that this is true is that movement of the bullet is constrained by contact between the detents of the to-be-engaged cam gear and the corresponding cam surfaces on the bullet and this cam gear.

If everything is substantially the same in the second method as in the first method, then the sequence of events, the timing, the start position and the end position are substantially the same in the second method as in the first method. This is because the relative motion of one cam gear relative to another is defined only by the gear ratio difference between the two gears. The valleys and peaks of the cam surfaces come into coincidence exactly the same in the second method as in the first method, and it is this relative motion of the peaks and valleys that determines almost everything about the shift sequence and its timing.

What is different about the second method is that the drive mechanism for the bullet may be significantly reduced in size and structure. Also in some applications, such as for bicycles, the elapsed time to complete a shift may be minimized in a transmission using the second method. This is because the gear shifting cam and the cam follower, which is connected to the bullet, need only have sufficient size and structure to axially move the flat cam surface at the middle portion of the bullet from under the engaged detents to thereby initiate a shift in the desired direction. Thereafter, the shift is completed by the forces applied to the detents by the engaged and to-be-engaged cam gears.

In-Line Embodiment

Figure 11:
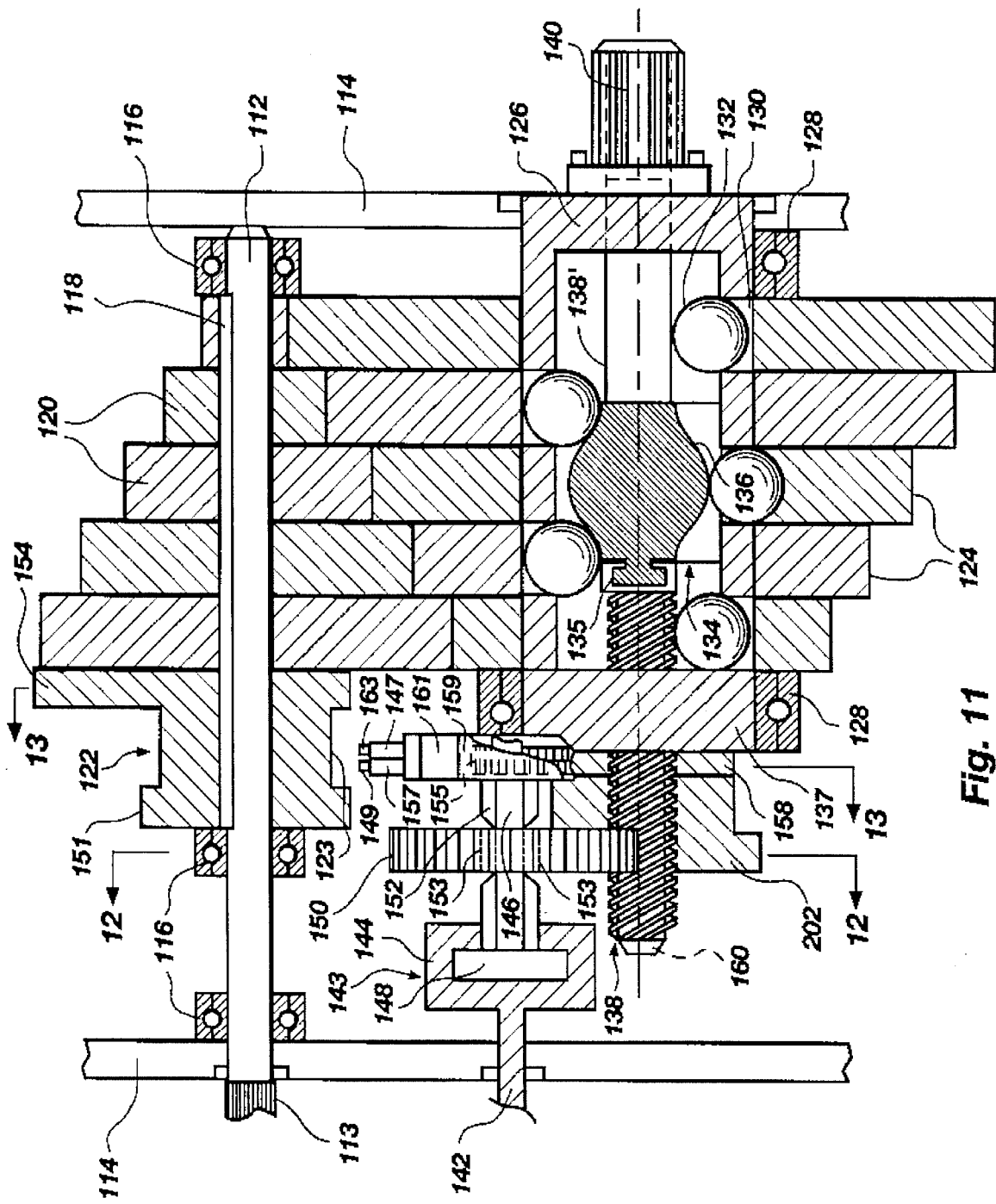
FIG. 11 is a fragmentary elevational view in partial cross section of the invention as modified for an in-line transmission system.
Figure 12:
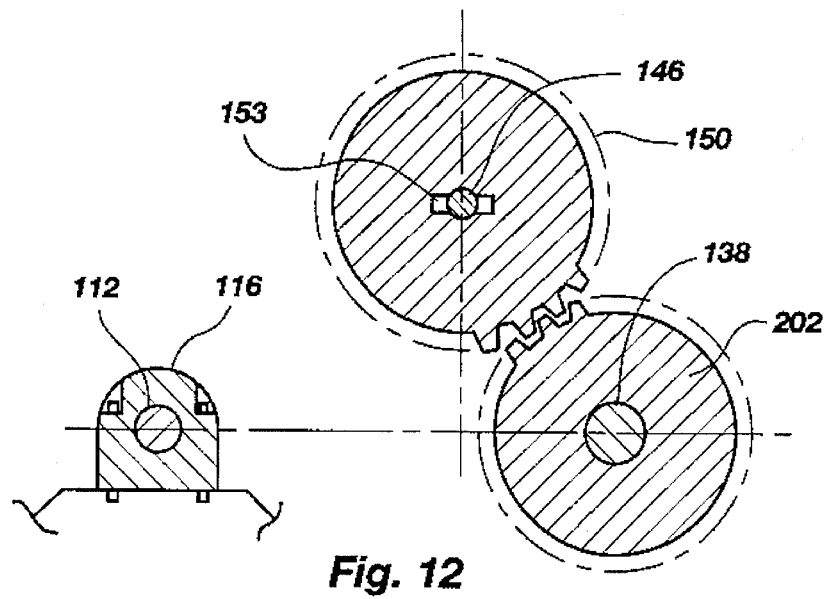
FIG. 12 is a cross-sectional view taken along line 12—12 of FIG. 11 and showing the shift shaft drive gears and an input shaft bearing.

FIG. 11. shows a diagrammatic side elevational view in cross section of an in-line transmission embodiment of a gear shifting mechanism according to the invention. An input shaft 112 is splined for connection to an engine at its driven end 113 on the outside of a transmission housing 114, and is mounted inside the housing by three sets of bearings 116, 116 and 116. The bearings 116 mount the input shaft 112 on the interior of housing 114 for axial rotation without lateral movement, and may be of the thrust bearing type to prevent axial movement.

The input shaft 112 runs through the center of and is locked by a key 118 to five input gears 120 of varying circumferences and to a shift cam member 122. Each of the five input gears 120 is permanently engaged by means of a gear tooth profile on its outer circumference with a corresponding gear tooth profile on one of five output cam gears 124. The gear tooth profiles of gears 120 and 124 may be of the spur type. The output cam gears 124 each have a uniform cam surface 58 (FIG. 3) on its inner periphery, and the peak tops P of cam surface 58 ride on the outer surface of a drum portion 126 of an output drive shaft 140. The drum 126 is mounted at both ends for rotation by two sets of bearings 128, 128. The bearings 128, 128 also retain the cam gears 124 in their proper lateral positions along drum 126.

Drum 126 is hollow and has five (5) sets of three apertures 130, one set corresponding to each of the five cam gears 124. The apertures 130 extend radially from the inner drum surface to the outer drum surface, and each of the fifteen drum apertures contains a corresponding detent 132. The innermost surfaces of the detents 132 come into contact with the radially and axially extending cam surfaces of a bullet 134. The bullet 134 is mounted within the drum such that it is capable of reciprocal axial movement back and forth along the rotational axis of the drum 126.

The bullet 134 has six outer cam surfaces in the form of grooves 136, each extending axially parallel to the drum axis and having a central portion of varying radial extent upon which the detents ride for radial reciprocating movement during their engagement with or disengagement from a cam gear. The axial movement of the bullet 134 is regulated by a screw shaft 138, one end of which is rotatably attached to the bullet at a pivot joint 135, and the other end of which passes through a drum wall 137 at the corresponding end of drum 126. Bolted to the opposite drum wall is an output spline 140, which includes an axial bore for sliding reciprocal movement of a shaft extension 138' attached to the bullet end opposite to pivot joint 135. The disengaged detents ride on the screw shaft 138 or on its extension 138', depending on the axial position of the bullet 134.

The gear shift lever (not shown) is connected to the female portion 144 of a union joint 143 by means of an actuating rod 142, which is moved axially by the shift lever. The female union portion 144 is attached to a shift actuator shaft 146 by a male union end 148. The shift actuator shaft 146 is supported for rotation and for reciprocal axial movement along its axis by bushings (not shown), which are similar to the bushings 88 shown in FIG. 7 and are attached to the housing 114.

When the shift actuator shaft 146 is pushed or pulled in either direction along its axis by actuating rod 142, it engages a shift actuator gear 150 by means of fixed keys 152, 152 on opposite sides of gear 150 and on opposite sides of the shaft circumference. The shift actuator gear 150 has internal keyways 153, 153 to receive the keys 152, 152 of the shift actuator shaft 146. The shift actuator shaft 146 also includes an actuator pinion 155. When shaft 146 is moved in either direction along its axis, the pinion 155 causes corresponding lateral movement of an upshift rack 157 and a down shift rack 147, which are referred to as shift racks.

Figure 13:
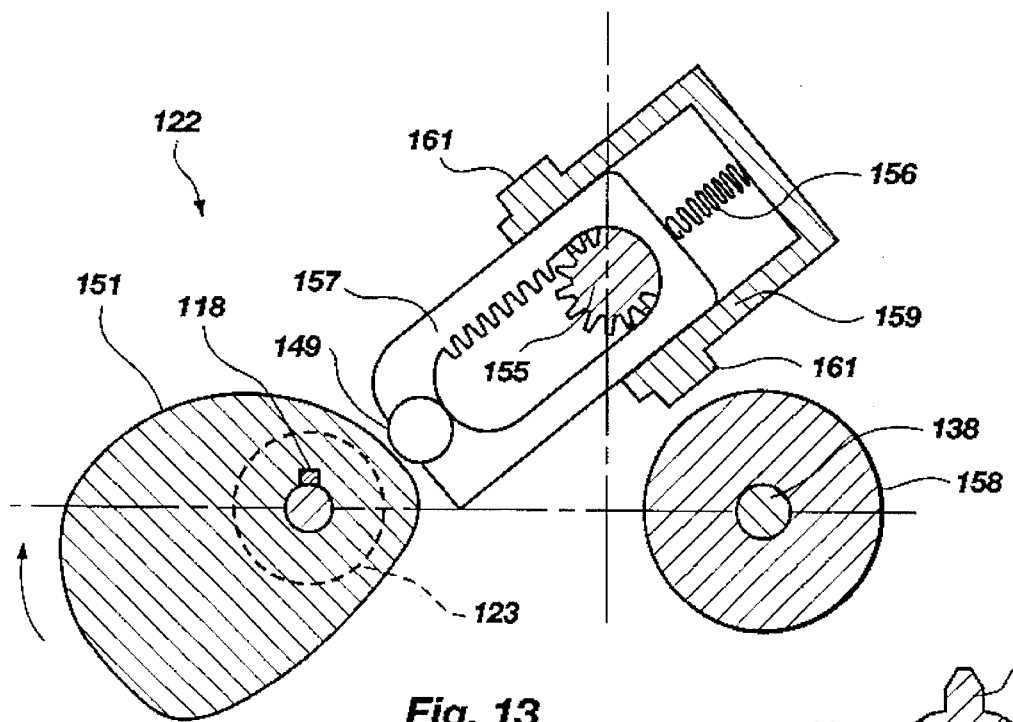
FIG. 13 is a cross-sectional view taken along line 13—13 of FIG. 11 and showing details of the shifting mechanism, including the shifting cam member and the cam follower mechanism.

As may be seen best in FIGS. 11 and 13, shift racks 147 and 157 are contained in a rack housing 159, which cooperates with pinion 155 to provide the reciprocal lateral movement of the shift racks. This lateral movement is guided by means of keys 161, 161 (FIG. 13) on opposite sides of the rack housing, which thereby allow the shift racks to move laterally along the axis of the shift actuator shaft 146. The housing 159 also provides for longitudinal reciprocal movement of the shift racks 147 and 157 in response to a downshift cam 151 and an upshift cam 154 around the periphery of shift cam member 122.

The shift racks 147 and 157 are held against their corresponding shift cams 151 and 154 by corresponding rack springs 156 during downshifting and upshifting respectively. When the gear shift has been completed, shift racks 147 and 157 are returned laterally to their neutral position over the central portion 123 of shift cam member 122 by spring means (not shown) having a recentering bias toward the central neutral zone, similar to the recentering of rack housing 100 provided by opposing disk springs 107, 107 of FIG. 7.

The shift actuator gear 150 has teeth on its outer circumference that engage the teeth of a shift collar 202 (FIG. 11). The center hole of the shift collar 202 is threaded to receive the screw shaft 138. The screw shaft 138 is held from rotating about its own axis by a screw shaft washer guide 158. For this purpose, the screw shaft washer guide 158 is bolted to the housing 112 and has a key (not shown) built into its inner circumference that slides in a slot 160 (shown by broken lines in FIG. 11) in the screw shaft.

During inward movement of the union joint 143 to its pushed position, the downshift rack 147 and its roller 149 move laterally over and in line with the downshift cam 151 of the shift cam member 122 which is affixed to the input shaft 112 by the key 118 (FIG. 13). In the pulled position of the union joint 143, the upshift rack 157 and its roller 163 move over and in line with the upshift cam 154 of the shift cam member 122. Shift cams 151 and 154 extend radially outward and around the peripheries of the respective ends of the shift cam member 122 as shown in FIG. 11. The peripheral configuration of the shift cams 151 and 154 can be varied to vary the position of the bullet 134 along the axis of drum 126 relative to the detents of the respective cam gears 124, and to thereby vary the timing of the sequential engagement between the drum 126 and the respective cam gears 124 relative to the speed of the shift cam member 122 as driven by input shaft 112.

Figure 15:
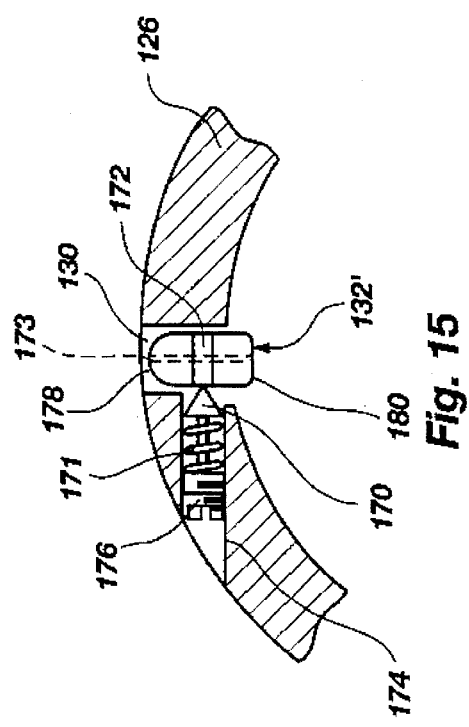

As previously indicated, each of the detents, such as detents 72, LD, HD and 132, may be held in its retracted position against the pull of centrifugal forces by a spring biased pin. One such arrangement is exemplified by FIG. 15 which shows a reciprocating pin 170 having a tapered head biased by a spring 171 into engagement with a groove 172 extending circumferentially around the mid-portion of a retracted detent 132', which is mounted for reciprocal movement in the aperture 130 of drum 126. The detent 132' may also have an oil orifice 173 extending axially therethrough to control the oil flow from the cam valley as it receives the detent, and thereby provide a predetermined amount of fluid dampening during each gear shift.

The pin 170 and its spring 171 are held within a laterally disposed bore 174 in the drum wall by means of a set screw 176, which also permits adjusting the tension in spring 171. The tension in spring 171 provides sufficient engagement between the projecting tip of the pin 170 and groove 172 to hold the detent 132' in its retracted position against the centrifugal forces created by rapid rotation of drum 126, while at the same time allowing the rounded head portion 178 of detent 132' to be readily extended into a cam valley of the corresponding cam gear in response to sliding engagement between the rounded detent foot 180 and a corresponding cam groove 136 of the bullet 134 (FIG. 11).

A similar spring biased pin arrangement may be provided for each of the detents in the embodiments of FIGS. 2–4 and 11 to insure that all inactive detents are held in their fully retracted positions against the centrifugal forces generated by drum rotation at high revolutions per minute (rpm). Thus, the inactive cam gears may rotate relative to the drum without any engagement between their cam surfaces and the corresponding inactive detents. Nevertheless, such positive retention of the inactive detents is optional because centrifugal force engagement between the inactive cam gears and their corresponding detents generally will not interfere with free rotation of these gears relative to the drum.

A robust design of the shifting mechanism can overcome, if necessary, the forces F and the resistances R to insure proper disengagement and engagement of the detents and a smooth transition between gear ratios. For example, this option can be used to lengthen the transition time for changing gear ratios.

Many other modifications of the constructions shown and described above will be apparent to the skilled person, and these modifications are within the scope of the appended claims. For example, the central portion of the cam surfaces of each bullet may be made more elongated and flat. Also, these and the other cam surfaces may have shapes and configurations other than those shown herein by way of example. A similar result may be accomplished by flattening out the shift cams and thereby reducing the ratio at which the bullet moves axially during each gear shift.

What is claimed:

1. A transmission apparatus for changing the speed of a driven member relative to the speed of a driving member while providing continuous torque to the driven member, said apparatus comprising:

a plurality of reducing gears;

driving means for causing said reducing gears to move in response to movement of said driving member;

a plurality of annular cam gears each in continuous driving engagement with a corresponding one of said reducing gears, each of said cam gears having an inner cam surface with at least one segment having a peak section and a valley section;

a hollow drum mounted for rotation about an axis and having a plurality of apertures extending radially from an inner drum surface to an outer drum surface, at least one of said apertures corresponding to each of said cam gars, and said cam gears being mounted for rotation about said outer drum surface such that said inner cam surface is in alignment with said at least one corresponding aperture and said outer drum surface is engaged by said at least one peak section;

a plurality of detents, one corresponding to each of said drum apertures and each arranged for reciprocating movement within its corresponding drum aperture;

a cam member mounted within said drum for reciprocal axial movement in opposite axial directions along said drum axis, said cam member comprising an outer cam surface extending longitudinally and having a central portion extending radially for respectively engaging said detents to hold an engaged detent in a first position at which it engages the valley section of the corresponding cam gear, end portions on either side of said central portion for allowing the engaged detent to move into a second position out of engagement with the inner cam surface of the corresponding cam gear and intermediate portions on either side of said central portion for causing the engaged detent to reciprocate between said first and second positions in response to axial movement of said cam member; and, actuating means for selectively moving said cam member in each of said axial directions relative to said drum so as to cause the engaged detent to engage the valley section of its corresponding cam gear such that a driving connection is made between said driving member and said driven member through said engaged cam gear, the inner cam surface of said cam gears and the outer cam surface of said cam member being contoured relative to each other and the axial movement of said cam member being timed such that said axial movement may commence only when the peak section of said engaged cam gear is substantially in a predetermined position relative to the valley section of an adjacent cam gear to be engaged by its corresponding detent, and said axial movement may cease only when said engaged cam gear is disengaged from its corresponding detent and the valley section of said adjacent cam gear is substantially engaged by its corresponding detent.

2. A transmission apparatus according to claim 1, wherein three of said apertures and three of said detents correspond to each of said cam gears, and wherein the inner cam surface of each of said cam gears comprises at least three of said cam segments.

3. A transmission apparatus according to claim 1, wherein said actuating means comprises a first cam surface, a second cam surface, first follower means responsive to said first cam surface for causing said cam member to move in one of said axial directions, and second follower means responsive to said second cam surface for causing said cam member to move in the other of said axial directions.

4. A transmission apparatus according to claim 1, wherein the number of said cam surface segments in each of said cam gears is a multiple of the number of detents in a radial plane common to the cam gear and its corresponding detents.

5. A transmission apparatus according to claim 1, wherein each of said detents is substantially spherical.

6. A transmission apparatus according to claim 1, wherein each of said detents is elongated such that one end is opposite another end, and wherein said one end is adapted to engage a corresponding outer cam surface of said cam member and said another end is adapted to engage the inner cam surface of a corresponding one of said cam gears.

7. A transmission apparatus according to claim 1, where said peak section forms an apex.

8. A transmission apparatus according to claim 1, wherein said reducing gears comprise concentric ring gears on a plate member, and said driving means comprises means for mounting said plate member for rotation about a central axis relative to said concentric ring gears.

9. A transmission apparatus according to claim 8, wherein said mounting means comprises a rotatably mounted axle, and said plate member is mounted on said axle for rotation therewith.

10. A transmission apparatus according to claim 9, wherein said mounting means further comprises means for rotatably mounting said axle on a bicycle frame, and said driving means further comprises pedal means for rotating said axle.

11. A transmission apparatus according to claim 8, wherein said actuating means comprises a first cam surface, a second cam surface, first follower means responsive to said first cam surface for causing said cam member to move in one of said axial directions, and second follower means responsive to said second cam surface for causing said cam member to move in the other of said axial directions.

12. A transmission apparatus according to claim 11, wherein said first and second cam surfaces comprise concentric rings on a face of said plate member.

13. A transmission apparatus according to claim 1, wherein said reducing gears comprise spur gears mounted in line for rotation about a common axis, each of said spur gears having an active radius that is different from the other spur gears.

14. A transmission apparatus according to claim 13, wherein said spur gears are mounted on a common shaft member for connecting said spur gears to a motor for rotating said common shaft member.

15. A transmission apparatus according to claim 13, wherein said actuating means comprises a first cam surface, a second cam surface, first follower means responsive to said first cam surface for causing said cam member to move in one of said axial directions, and second follower means responsive to said second cam surface for causing said cam member to move in the other of said axial directions.

16. A transmission apparatus according to claim 15, wherein said first and second cam surfaces are provided by cam means mounted for rotation in synchronization with said spur gears.

17. A transmission apparatus according to claim 1, wherein the inner cam surface of each of said cam gears comprises at least three substantially identical segments, each of said segments having a peak section and valley section connected by an incline section.

18. A transmission apparatus according to claim 17 wherein said hollow drum includes a plurality of aperture sets each of which has a least three of said apertures arranged in a radial plane common to a corresponding one of said cam gears, and wherein each of said apertures contains a corresponding detent.

19. A transmission apparatus according to claim 18, wherein the number of said cam surface segments in each of said cam gears is a multiple of the number of detents in said corresponding common radial plane.

20. A transmission apparatus according to claim 19, wherein each of said cam gears has six of said cam surface segments, and said hollow drum has three of said apertures corresponding to each of said cam gears.

* * * * *